US007933421B2

(12) United States Patent
Asada

(10) Patent No.: US 7,933,421 B2
(45) Date of Patent: Apr. 26, 2011

(54) SOUND-FIELD CORRECTING APPARATUS AND METHOD THEREFOR

(75) Inventor: Kohei Asada, Kanagawa (JP)

(73) Assignee: Sony Corporation (JP)

( * ) Notice: Subject to any disclaimer, the term of this patent is extended or adjusted under 35 U.S.C. 154(b) by 1278 days.

(21) Appl. No.: 11/129,989

(22) Filed: May 16, 2005

(65) Prior Publication Data

US 2005/0265559 A1 Dec. 1, 2005

(30) Foreign Application Priority Data

May 28, 2004 (JP) ................................ P2004-159580

(51) Int. Cl.
*H04B 1/00* (2006.01)
*H04R 5/00* (2006.01)
*H04R 5/02* (2006.01)

(52) U.S. Cl. ................ 381/86; 381/17; 381/18; 381/19; 381/302; 381/303

(58) Field of Classification Search .................... 381/17, 381/18, 86, 56, 302, 303, 309, 310, 19
See application file for complete search history.

(56) References Cited

U.S. PATENT DOCUMENTS 5,982,903 A * 11/1999 Kinoshita et al. ............... 381/18
2004/0032955 A1* 2/2004 Hashimoto et al. ............. 381/18

FOREIGN PATENT DOCUMENTS

JP 58-175400 A 10/1983
JP 62-125933 A 6/1987
JP 02-015800 A 1/1990
JP 2-065500 A 3/1990
JP 03-258200 A 11/1991
JP 04-014999 A 1/1992
JP 5-260600 A 10/1993
JP 05-276599 A 10/1993
JP 6-121396 A 4/1994
JP 7-087598 A 3/1995
JP 7-184298 A 7/1995
JP 9-009400 A 1/1997
JP 9-200897 A 7/1997
JP 10-228286 A 8/1998
JP 11-046400 A 2/1999
JP 2000-059898 A 2/2000
JP 2002-112400 A 4/2002
JP 2003-333697 A 11/2003

* cited by examiner

*Primary Examiner* — Vivian Chin
*Assistant Examiner* — George Monikang
(74) *Attorney, Agent, or Firm* — Lerner, David, Littenberg, Krumholz & Mentlik, LLP

(57) ABSTRACT

A sound-field correcting apparatus includes a sound-field correcting unit for executing, based on a correcting information, predetermined audio signal processing for correcting a sound field, an information acquiring unit for acquiring the correcting information on each position, a designating unit for designating, in a predetermined space range including the positions, a target position serving as a position at which sound-field correction is to be performed, a correcting information acquiring unit for acquiring, based on the correcting information on each position, correcting information corresponding to the target position designated by the designating unit, and a control unit for performing control based on the correcting information acquired by the correcting information acquiring unit so that the sound-field correcting unit executes the audio signal processing.

7 Claims, 11 Drawing Sheets

SOUND-FIELD CORRECTING APPARATUS AND METHOD THEREFOR

CROSS REFERENCES TO RELATED APPLICATIONS

The present invention contains subject matter related to Japanese Patent Application JP 2004-159580 filed in the Japanese Patent Office on May 28, 2004, the entire contents of which are incorporated herein by reference.

BACKGROUND OF THE INVENTION

1. Field of the Invention

The present invention relates to a sound-field correcting apparatus for correcting sound fields formed by sounds output from speakers to space by, for example, a multichannel audio system or the like, and to a method therefor.

2. Description of the Related Art

When a listener listens to sounds output from a plurality of speakers by playing back audio signals in a multichannel audio system, sound fields (acoustic effects) that the listener experiences as differing depending on a change in balance (such as the sound arrival time from each speaker) in accordance with a listening environment, such as the structure of a listening room and the listening position of the listener to the speakers. This results in the inability of the listener in the listening position to experience appropriate sound fields depending on the state of the listening environment.

Such a problem noticeably occurs in an environment such as the inside of an automobile. In the inside of the automobile, because the position of the listener is almost limited to a seat position, a distance between the listener and each speaker is unequal, thus causing the sound arrival time from the speakers to differ. This produces an unbalanced sound field. In addition, the inside of the automobile is relatively small and is an almost completely sealed state. Accordingly, reflected sounds reach the listener while being complexly combined, causing an unbalanced sound field. Moreover, due to limitation of the positions at which the speakers can be installed, it is less common to install the speakers so that the sounds directly reach the listener's ears. Also a change in sound quality caused thereby affects the sound fields.

Accordingly, implementation of sound-field correction is known so that, in a listening environment where an audio system is actually used, the listener can listen to good sound fields as close to the original sound source as possible. In this sound-field correction, for example, for the audio signal to be output from each speaker, a delay time is adjusted so that a time difference of sound reaching the listener's ears can be corrected.

To efficiently perform sound-field correction, for example, instead of a simple implementation in which the user (listener) performs adjustment based on audibility only, it is preferable to automatically perform the correction with an apparatus.

Specifically, at first, by using a sound-field correcting apparatus, acoustic characteristics in the listening environment are measured. Based on the result of this measurement, a signal processing parameter for sound-field correction is set in an output system of the audio system. By using the speakers to output audio signals processed in accordance with the parameter set as described above, the listener can listen to the sound source in good sound fields corrected so as to adapt to the listening environment, without the user having to perform a particular sound field adjusting operation.

Regarding the measurement of the acoustic characteristics and sound-field correction based on the result of the measurement, for example, the following technique is known (see, for example, Japanese Unexamined Patent Application Publication No. 10-228286).

Firstly, in the listening environment, a microphone is disposed at a listening position (correcting position) corresponding to the position of the listener's ears. The sound-field correcting apparatus outputs measuring sounds from the speakers, uses the microphone to collect the output sounds, and converts audio signals based on the collected sounds from analog to digital form. The sound-field correcting apparatus obtains, for example, the distance information between each speaker and the listening position (the microphone-disposed position or a sound collecting position). Since the arrival time of sound in space from each speaker to the listening position is obtained based on the information of the distance, the sound-field correcting apparatus uses information of the arrival time from the speaker to set a delay time for an audio signal on a channel corresponding to the speaker so that sounds emitted from the speakers can reach the listening position with the same timing. In general, this correction is also called "time alignment".

SUMMARY OF THE INVENTION

The sound-field correcting apparatus that performs the above-described sound-field correction obtains a correction parameter corresponding to a listening position (correcting position) at which measurement is performed. This indicates that the sound-field correcting apparatus can perform sound-field correction only for a listening position (correcting position) at which the correction parameter is obtained by measurement or the like.

For example, it is assumed that, by performing measurement at a listening position obtained when a listener sits in the driver's seat in an automobile and a listening position obtained when the listener sits in the front passenger seat, correction parameters for both listening positions are obtained. In this case, the sound-field correcting apparatus can perform sound-field correction matching either listening position.

Here, it is assumed that there are occupants in the driver's seat and the front passenger seat. In this case, naturally, if sound-field correction matching the driver's seat is performed, the sound fields heard by the person in the front passenger seat have poor balance. Conversely, if sound-field correction matching the front passenger seat is performed, the sound fields heard by the person in the driver's have poor balance.

It can be easily expected that, in such a case, actually, by setting an intermediate position between the driver's seat and the front passenger seat to have appropriate sound fields, sound fields acceptable at both listening positions can be created.

Accordingly, when the sound-field correcting apparatus of the related art is used to perform setting so as to perform sound-field correction matching an intermediate listening position between the driver's seat and the front passenger seat, it is necessary to find a correcting position after setting one listening position as the above intermediate listening position (the correcting position or a measuring position), so that a user of the apparatus is forced to perform a relatively complicated operation.

In addition, actually, it is preferable that, depending on the situation, the sound-field correction have as high flexibility as possible, such as, in an intermediate range between the driver's seat and the front passenger seat, setting a position as an appropriate sound field to be closer to the driver's seat, and conversely setting the position to be closer to the front passenger seat. However, as can be understood from the above description, it is difficult for the present sound-field correction to have high flexibility because the sound-field correction needs a time-consuming operation in which a correction parameter corresponding to a listening position (the correcting position or the measuring position) is not obtained unless measurement is performed after determining the listening position.

According to an embodiment of the present invention, there is provided a sound-field correcting apparatus including a sound-field correcting means for executing, based on correcting information, predetermined audio signal processing for correcting a sound field, an information acquiring means for acquiring the correcting information on each of a plurality of positions, a designating means for designating a target position in a predetermined space range including the plurality of positions, the target position serving as a position at which sound-field correction is to be performed, a correcting information acquiring means for acquiring, based on the correcting information on each of the plurality of positions, correcting information corresponding to the target position designated by the designating means, and a control means for performing control based on the correcting information acquired by the correcting information acquiring means so that the sound-field correcting means executes the audio signal processing.

According to another embodiment of the present invention, there is provided a sound-field correcting method for executing, based on correcting information, predetermined audio signal processing for correcting a sound field, the sound-field correcting method including the steps of acquiring the correcting information on each of a plurality of positions, designating a target position in a predetermined space range including the plurality of positions, the target position serving as a position at which sound-field correction is to be performed, based on the correcting information on each of the plurality of positions, acquiring correcting information corresponding to the designated target position, and performing control based on the correcting information acquired in the step of acquiring the correcting information so that the audio signal processing is executed.

According to each of the embodiments, in the present invention, for sound-field correction, it is a minimum requirement to obtain correcting information on at least two normal correcting positions. In addition, correcting information on other correcting positions in a predetermined positional range including the above normal correcting positions is obtained by performing calculation using correcting information on the plurality of normal correcting positions. In other words, this indicates that, in the present invention, only by acquiring correcting information on at least two normal correcting positions, correcting information on a correcting position other than the normal correcting positions can be acquired without actually performing acoustic measurement, and appropriate sound-field correction matching this correcting position can be performed.

Designation of a correcting position in a predetermined positional range including the plurality of correcting positions is performed by a user operation through a user interface.

From the foregoing, according to an embodiment of the present invention, even in the case of performing sound-field correction, in which, for example, a position other than normal correcting positions is used as a correcting position, the sound-field correction can be easily and simply performed without performing a time-consuming registering process such as new measurement. In addition, correcting information on a correcting position other the normal correcting positions can be found by calculation. Thus, a designated correcting position other the normal correcting positions is changed, also corresponding correcting information can be immediately obtained by calculation. Therefore, it may be said that selection of a correcting position at which sound-field correction can be performed has high flexibility.

In addition, since designation of a correcting position, which is subject to sound-field correction, is performed by operating a user interface, when a user performs an operation of designating the correcting position, it appears for the user that the operation is directly reflected in the sound-field correction. This enhances the above-described convenience, simpleness, and flexibility of sound-field correction.

DESCRIPTION OF THE PREFERRED EMBODIMENTS

An embodiment of the present invention is described below.

A sound-field correcting apparatus according to an embodiment of the present invention is provided in a multichannel audio system. In other words, the sound-field correcting apparatus has a function of correcting sound fields formed by sounds output from speakers corresponding to the multichannel audio system. This embodiment exemplifies a case in which the audio system is included in an audio/video (AV) system that can perform not only audio playback but also video playback. In this embodiment, the AV system is a so-called "on-vehicle audio system" that is provided in an automobile.

Figure 1:
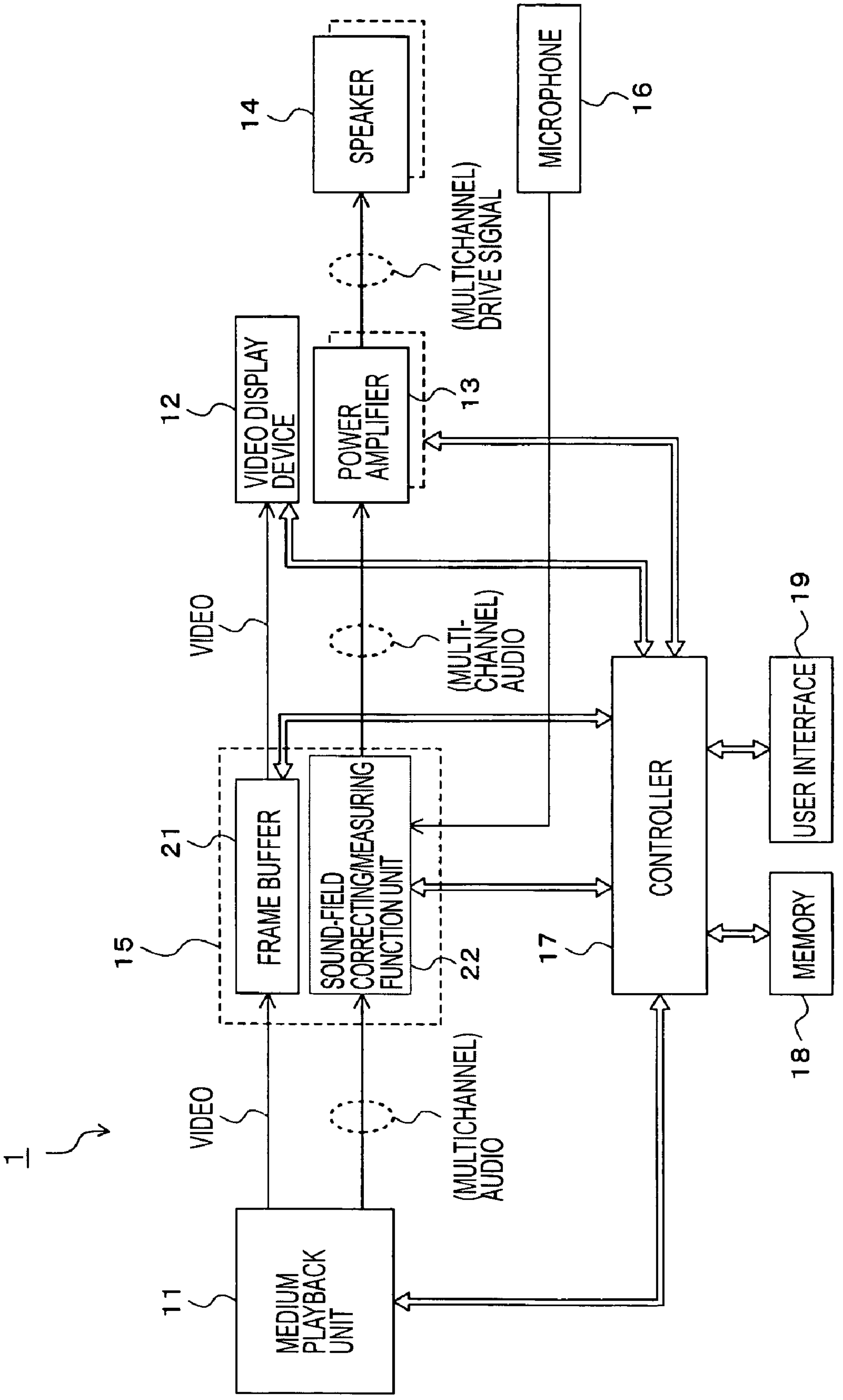
FIG. 1 is a block diagram showing the entire configuration of an AV system including a sound-field correcting apparatus according to an embodiment of the present invention.

FIG. 1 shows an example of the entire configuration of an AV system 1 including the sound-field correcting apparatus according to the embodiment of the present invention.

In the AV system 1 shown in FIG. 1, a media playback unit 11 outputs a video signal and audio signals by playing back a medium having data recorded as, for example, video and audio content. The media playback unit 11 can output the video signal and the audio signals in digital form. In this case, the type, format, etc., of the medium to be played back by the media playback unit 11 is not particularly limited. However, at present, the medium can be a digital versatile disc (DVD). When the media playback unit 11 is specifically configured to play back a DVD, by reading data recorded as video and audio content on the DVD in a loaded state, the media playback unit 11 can obtain video data and audio data which should be simultaneously played back and output. In the existing DVD format, the video data and the audio data have a coding format in which both are compressed and coded in accordance with a predetermined system based on the DVD standard. The compressed and coded video data and audio data can be decoded. A digital video signal and digital audio signals, obtained by the decoding, can be output with timing with which a playback time is synchronized.

The media playback unit 11 can be configured for so-called multimedia so as to play back, for example, an audio CD (compact disk) in addition to DVD. In addition, the media playback unit 11 may be configured as a stand-alone television tuner that outputs a video signal and audio signals by receiving and demodulating a television broadcast or the like. Alternatively, the media playback unit 11 may have a configuration formed by combining television tuner functions and package media playback functions. Furthermore, the media playback unit 11 may be configured as a storage device such as a hard disk drive, and various types of content stored in the storage device may be played back and output.

When the media playback unit 11 is configured for multi-audio channels, the media playback unit 11 can output played-back audio signals through plural-system signal lines which each correspond to each audio channel. In this embodiment, by way of example, when the media playback unit 11 is designed for a 5.1-channel surround system having, at maximum, a center channel (C), a front-left channel (FL), a front-right channel (FR), a left surround channel (BL), a right surround channel (BR), and a subwoofer channel, the media playback unit 11 can output audio signals through six systems corresponding to these channels.

The video signal output from the media playback unit 11 is input to a video display device 12 through a frame buffer 21 of a sound-field correcting unit 15. The audio signals output from the media playback unit 11 are input to a power amplifier 13 through a sound-field correcting/measuring function unit 22 in the sound-field correcting unit 15. The configuration of the sound-field correcting unit 15 is described later.

The video display device 12 displays video based on the input video signal. In this case, a display device actually used as the video display device 12 is not particularly limited. For example, at present, various types of display devices, such as a cathode-ray tube, a liquid crystal display, and a plasma display panel, can be employed.

The power amplifier 13 outputs a drive signal for driving the speakers by amplifying the input audio signals. In this case, the power amplifier 13 includes a plurality of power amplification circuits corresponding to the audio channels for which the AV system 1 is designed. By amplifying the audio signal corresponding to the channels, the power amplification circuits can output drive signals to speakers 14, which correspond to the channels. Accordingly, the number of the speakers 14 corresponds to the audio channels for which the AV system 1 is designed. For example, when the AV system 1 is designed for the above-described 5.1-channel surround system, the power amplifier 13 includes six power amplification circuits. In addition, the number of the speakers 14 is six correspondingly to the channels, and each of them is disposed at an appropriate position in the listening environment.

By amplifying the audio signal each channel by the power amplifier 13, and supplying the obtained drive signal to the speaker 14 corresponding to the channel, sound on the corresponding channel is output to space from the speaker 14. This plays back and outputs the sound of content in a state in which sound fields are formed for the multichannel system. For confirmation, in the played-back sound output from the speakers 14, synchronization (so-called "lip-sync") with video displayed on the video display device 12 in accordance with the video signal is maintained.

In this case, as shown in FIG. 1, the sound-field correcting unit 15 includes the frame buffer 21 and the sound-field correcting/measuring function unit 22.

At first, the sound-field correcting/measuring function unit 22 is described below.

The sound-field correcting/measuring function unit 22 has two functions. One is a measuring function in which, in order to set a parameter for sound-field control necessary for sound-field correction, acoustic measurement concerning a listening environment is performed. When this function is executed, a measuring sound signal is output to the power amplifier 13 so that measuring sound is output from an appropriate audio channel, if necessary.

In addition, in accordance with the parameter for sound-field control set in accordance with the result of measurement by the measuring function, the sound-field correcting/measuring function unit 22 performs predetermined signal processing on the audio signal on each channel input from the media playback unit 11. By using the measuring function, the sound fields formed by the sound of content output from the speakers 14 are corrected so as to be optimal at an appropriate listening position.

As described above, when the audio information read from the medium is compressed and coded, the media playback unit 11 performs decoding on the audio information and outputs a digital audio signal. Accordingly, the sound-field correcting unit 15 can perform sound-field correction by performing signal processing on an audio signal having a format formed by decoding processed information such as the compressed and coded information. In addition, a signal having a format obtained by decoding coded information may be generated as a measuring sound, which is output from the sound-field correcting unit 15 (the sound-field correcting/measuring function unit 22) to the power amplifier 13. Accordingly, also regarding playback of the measuring sound, encoding/decoding processing for processing such as compression and coding is not necessary.

That the signal processing for sound-field correction is performed as described above is that the audio signal input from the media playback unit 11 is routed through a digital signal processor (DSP). Because of the routing of the audio signal through the DSP, a time lag occurs in a playback time for the video signal output similarly from the media playback unit 11. The frame buffer 21 is provided in order to delete the time lag to achieve so-called "lip-sync". In other words, a controller 17 executes control so that, after the video signal input from the media playback unit 11 is written in units of, for example, frames for temporary storage in the frame buffer 21, it is output by the video display device 12. This allows the sound-field correcting unit 15 to output a video signal and audio signals with which the playback time is appropriately synchronized by elimination of the above time lag.

The controller 17 is formed by a microcomputer including a central processing unit (CPU), a read-only memory (ROM), and a random access memory (RAM), and controls various types of functional portions forming the sound-field correcting apparatus 1 shown in FIG. 1 and executes various types of processing.

In this case, the controller 17 connects to a memory 18 and a user interface 19.

The memory 18 stores at least various types of information necessary for signal processing for sound-field correction in the sound-field correcting unit 15. The memory 18 is formed by a nonvolatile memory element such as a flash memory.

A microphone 16 is provided for collecting the measuring sounds from the speakers 14 when the sound-field correcting/measuring function unit 22 in the sound-field correcting unit 15 performs sound field measurement. An audio signal from the microphone 16 is input to the sound-field correcting/measuring function unit 22.

Figure 2:
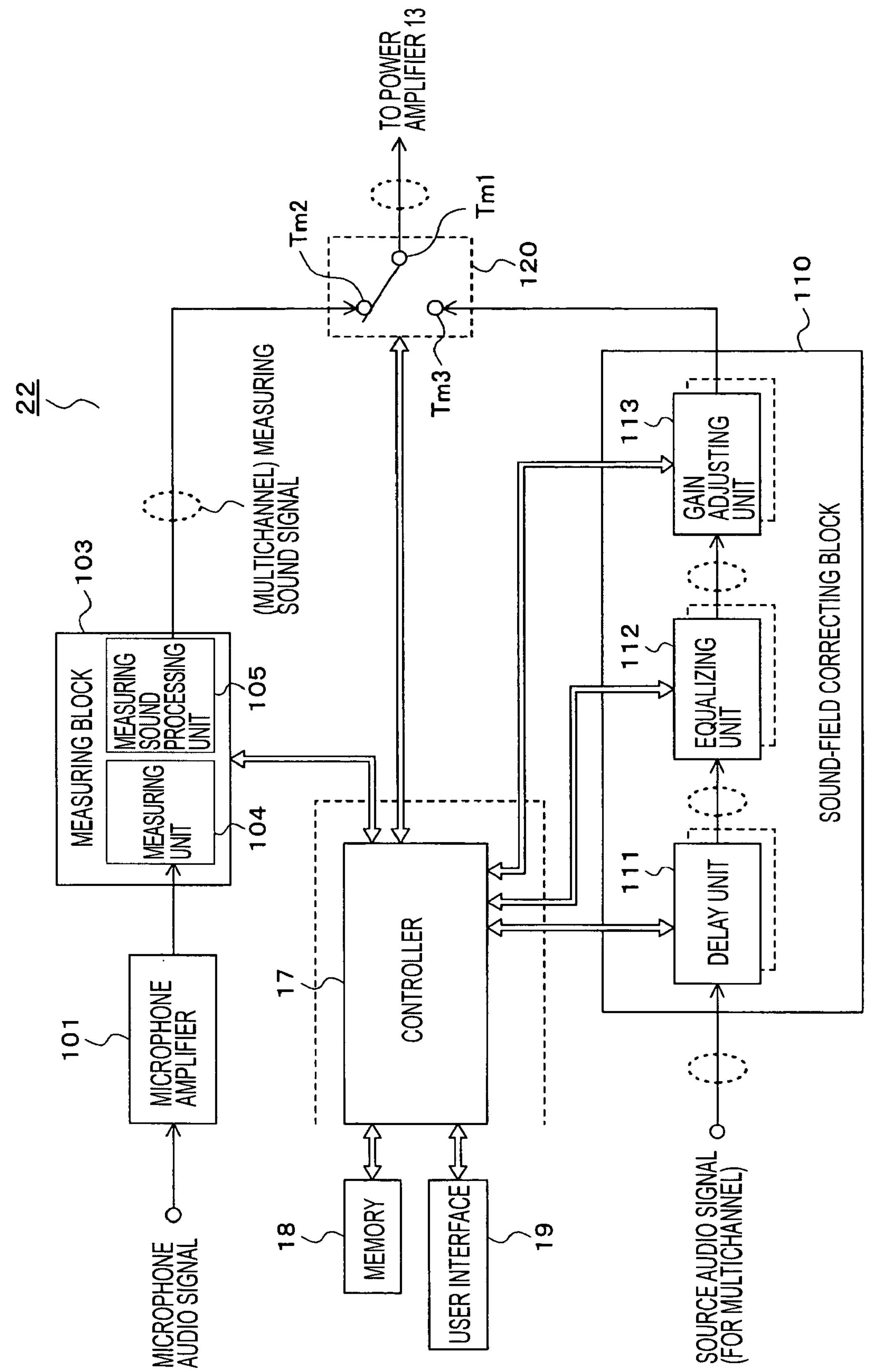
FIG. 2 is a block diagram showing an example of the configuration of a sound-field correcting/measuring function unit in the AV system shown in FIG. 1.

FIG. 2 shows an example of the internal configuration of the sound-field correcting/measuring function unit 22. As shown in FIG. 2, the sound-field correcting/measuring function unit 22 roughly includes a microphone amplifier 101, a measuring block 103, and a sound-field correcting block 110. The sound-field correcting block 110 performs processing for sound-field correction, and the microphone amplifier 101 and the measuring block 103 execute measuring. Based on the result of the measuring, the values of various types of parameters necessary for the sound-field correction by the sound-field correcting block 110 are changed, if necessary.

In addition, the sound-field correcting/measuring function unit 22 also includes a switch 120 for switching between a measuring mode and a sound-field correcting mode. In the switch 120, switching is performed so that one of terminals Tm2 and Tm3 is connected to a terminal Tm1. This switching operation is controlled by the controller 17.

A measuring sound processing unit 105 in the measuring block 103 generates an audio signal concerning the measuring sound, and outputs the generated audio signal as a measuring sound signal.

Although, in FIG. 2, for brevity of illustration, one signal output line from the measuring sound processing unit 105 is shown, actually, there are signal output lines (of measuring sounds) corresponding to eight channels for a 7.1-channel surround system.

In FIG. 2, the measuring sound output from the measuring sound processing unit 105 in the measuring block 103 is input to the power amplifier 13 through the switch 120 (the terminal Tm2 to Tm1). The power amplifier 13 in FIG. 1 amplifies the input audio signal of measuring sound and outputs the amplified sound from the speakers 14.

As can be understood from the above description, when the audio signals of measuring sounds (phonemes) are simultaneously output from a plurality of channels, the power amplifier 13 amplifies the audio signal on each channel and outputs the amplified signal from the speaker 14 on the corresponding channel.

This allows the speaker 14 to output the measuring sound as actual sound to peripheral space.

In the case of measurement, also as shown in FIG. 1, the microphone 16, which collects the measuring sound, is connected to the sound-field correcting/measuring function unit 22. As shown in FIG. 2, an audio signal from the microphone 16 connected to the sound-field correcting/measuring function unit 22 is input to the microphone amplifier 101.

The microphone 16 is installed for sound collection at a listening position (correcting position) in which the best corrected sound fields can be obtained in the listening environment. For example, although the sound-field correcting apparatus 1 is of an on-vehicle type, if the user wishes for appropriate sound fields to be obtained while the user is listening in the driver's seat, the microphone 16 is disposed at a position at which the user's ears may be almost positioned in a state in which the user sits in the driver's seat.

In this case, it is assumed that, as described above, in the measuring mode, the speaker 14 outputs measuring sounds in response to the measuring sound signals output from the speakers 14, peripheral environmental sounds including the measuring sounds are collected by the microphone 16. The audio signal of the collected sounds is amplified by the microphone amplifier 101 and is input to the measuring unit in the measuring block 103.

The measuring unit 104 obtains a response signal by performing predetermined analog-to-digital conversion on the input audio signal, and performs various types of processing, such as an FFT (fast Fourier transform) frequency analyzing process. The result of the processing produces, for example, a distance from the speaker of each channel to the measuring (correcting) position (the installation position of the microphone 16), and, in addition, results of measurement concerning necessary measurement items.

Next, in order to switch to the sound-field correcting mode, the terminal Tm3 is connected to the terminal Tm1 in the switch 120.

When the sound-field correcting apparatus 1 is in the sound-field correcting mode, source audio signals are input to the sound-field correcting block 110. The source audio signals in this context are audio signals to be played back and output by the media playback unit 11. As described above, in the case of, for example, a 7.1-channel surround system, plural audio signals that match a multichannel system having a maximum of eight channels may be input to the sound-field correcting block 110. The sound-field correcting block 110 includes a delay unit 111, an equalizing unit 112, and a gain adjusting unit 113. Each of these units is configured to independently process each of the audio signals on the maximum of eight channels (7.1-channel surround system).

In the sound-field correcting block 110, the delay unit 111 can output delayed signals by delaying the input audio signals on the channels for different delay times. The delay unit 111 corrects sound-field disturbance caused by a time difference of sounds reaching the listening position from each speaker 14 in accordance with a difference in distance from the speaker 14 to the listening position. In other words, the delay unit 111 performs sound-field correction which is so-called "time alignment".

In addition, in the equalizing unit 112, after independently setting an arbitrary equalizing characteristic for the input audio signal on each channel, the obtained audio signal can be output. The equalizing unit 112 corrects sound quality that changes due to the relationship between the position of each speaker 14 and the listening position, the state of an obstacle positioned between the speaker 14 and the listening position, and, in addition, variation in playback acoustic characteristic of the speaker 14.

In the gain adjusting unit 113, after independently setting gain in the input audio signal on each channel, the obtained audio signal can be output. The gain adjusting unit 113 corrects sound volume that varies for each channel in accordance with the relationship between the position of each speaker 14 and the listening position, the state of an obstacle positioned between the speaker 14 and the listening position, and the distance between the speaker 14 and the listening position.

The sound-field correcting block 110, which has the above signal processing function, is formed as, for example, a DSP for audio signals.

The controller 17 can obtain, as the results of measurement by the measuring block 103, information such as a time difference (distance from each speaker 14 to the listening position) of sounds reaching the listening position between the audio channels, a change in sound quality in a stage in which the sound on each audio channel reaches the listening position, and a state of variation in level.

Based on, for example, information of the time difference of sounds reaching the listening position between the audio channels, a delay time is set, as a sound-field parameter, for each audio channel in the delay unit 111 so that the time difference can be eliminated. In other words, sound-field correction which is so-called "time alignment" is performed.

In addition, based on information of a change in sound quality in a stage in which the sound on each audio channel reaches the listening position, an equalizing characteristic is set for each audio channel in the equalizing unit 112. In addition, based on information of the variation in level of sound (on each audio channel) reaching the listening position, a gain is set for each audio channel in the gain adjusting unit 113 so that the variation can be eliminated.

The source audio signals input to the sound-field correcting block 110 are processed by the delay unit 111, the equalizing unit 112, and the gain adjusting unit 113, in which the parameters are set as described above, and are subsequently amplified by the power amplifier 13. The amplified signals are output as actual sounds from the speakers 14. Sound fields formed by the sounds output in the above manner are improved for the better than correction when the user listens at an appropriate position.

Here, regarding a specific example of the measuring by the measuring block 103, a configuration and operation for measuring a "distance" from each speaker actually installed in the AV system 1 and the listening (correcting) position are described below.

Here, the "distance" from each speaker actually installed in the AV system 1 and the listening position is information corresponding to "time" of a sound that reaches the listening position from the speaker corresponding to each audio channel. In other words, the information of the distance from the speaker to the listening position is used for time alignment by the delay unit 111 in the sound-field correcting block 110.

Measurement of the distance from each speaker to the listening position is performed by the following process. At first, among from the speakers 14 in the AV system 1, one speaker is selected and the selected speaker is used to output a measuring sound for distance measurement. The measuring sound is a time stretched pulse (TSP) signal having predetermined frequency band characteristics. The measuring sound of the TSP signal is input, as an audio signal obtained by one microphone 16 installed so as to correspond to the listening (correcting) position for correction, from the microphone amplifier 101 to the measuring unit 104 through the switch 120 (terminal Tm1 to Tm2). The measuring unit 104 can obtain sampling data generated by sampling the waveform of the input audio signal in units of predetermined numbers of samples. For example, one obtained by dividing the sampling data by the TSP signal on a frequency base is treated as an impulse response.

By executing arithmetic processing or the like for necessary signal processing and measurement on the basis of the impulse response, the measuring unit 104 can obtain, as the result of measurement, information of the distance (speaker-to-microphone distance) from one speaker 16, from which sound is output, to the listening (correcting) position (the position of the microphone 16).

After that, as described above, in a sequential manner, each of the other speakers is allowed to perform the operation of measuring a speaker-to-microphone distance based on an impulse response obtained such that the microphone 16 receives an impulse output from one speaker 14. This can obtain speaker-to-microphone-distance (correcting position/listening position) information for each of all the speakers forming audio channels of the AV system.

In this embodiment, in the above manner, the measuring block 103 in the sound-field correcting/measuring function unit 22 can perform measurement for sound-field correction. As the result of the measurement, sound-field correcting information, typified by, for example, the speaker-to-microphone-distance information, is obtained. Based on the correcting information, the parameters of the delay unit 111, the equalizing unit 112, and the gain adjusting unit 113 in the sound-field correcting block 110 can be changed.

By way of example, the correcting information of the above speaker-to-microphone distance is used for time alignment, as described above. In other words, based on a speaker-to-microphone distance (correcting position) for each audio channel, the controller 17 calculates a delay time to be set in the audio signal on each audio channel so that sounds emitted from the speakers on the audio channels, based on the audio signals on the audio channels in the delay unit 111, simultaneously reach the correcting position. The controller 17 also sets the calculated delay time in a delay element corresponding to each audio channel in the delay unit 111.

In this embodiment, as described above, the result of measurement obtained by installing the microphone 16 at the listening position and performing acoustic measurement, that is, correcting information, can be stored in the memory 18.

Accordingly, at the listening position (normal correcting position) at which the correcting information is obtained by actually installing the microphone 16 for measurement, based on the correcting information stored in the memory 18, by variably setting the parameters of the delay unit 111, the equalizing unit 112, and the gain adjusting unit 113 in the sound-field correcting block 110, appropriate sound-field correction can be performed. In other words, the normal correcting position is a listening position at which direct sound-field correction is performed based on the correcting information. In addition, this normal correcting position is registered when correcting information obtained by measurement or the like is stored in the memory 18.

A case in which two different positions are registered as normal correcting positions as described above is described below. Since, in the AV system 1 in this embodiment, the AV system 1 is of an on-vehicle type, it is assumed that a listening position in the driver's seat and a listening position in the front passenger seat are registered.

Figure 3B:
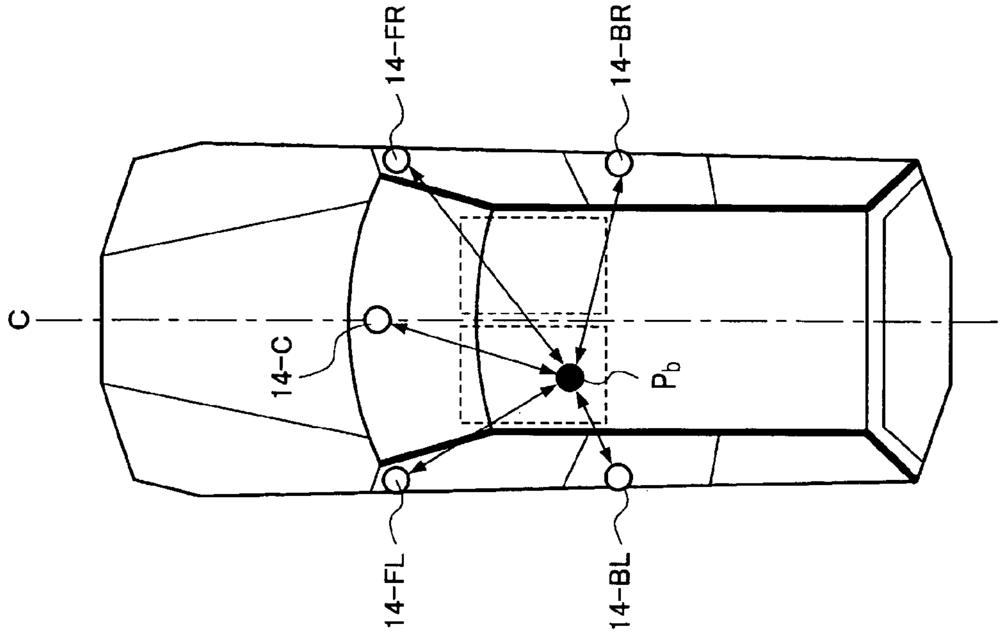
FIGS. 3A and 3B are top views each showing a positional relationship between speaker arrangement in the inside of an automobile and each of listening positions on a driver's seat and a front passenger seat.
Figure 3A:
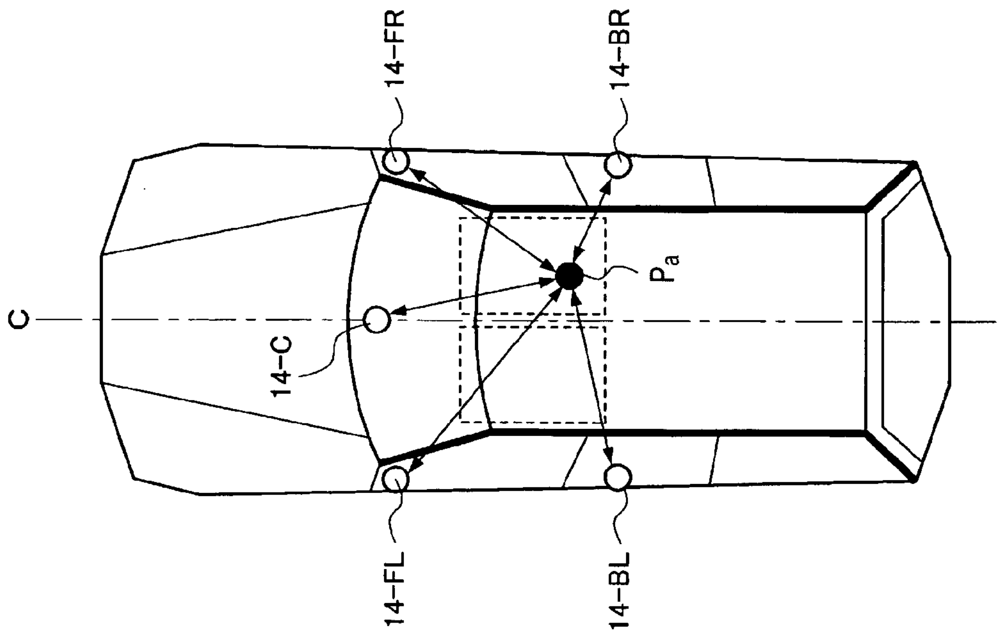

FIGS. 3A and 3B show an example of arrangement of the speakers 14 in the AV system 1 in this embodiment in an automobile, and relationships with the speakers 14 of the listening positions on the driver's and front passenger seats, which are normal correcting positions. In this case, a front right seat is the driver's seat and a front left seat is the front passenger seat. FIG. 3A shows relationships between a listening position $P_a$ (as the normal correcting position) in the driver's seat and each speaker 14. At first, by using FIG. 3A, the example of arrangement of the speakers 14 is described.

As also described above, the AV system 1 in this embodiment can handle a maximum of 5.1 channels for surround sound. Accordingly, in the automobile, six speakers are disposed as the speakers 14. The six speakers are composed of a center channel speaker 14-C, a front left channel speaker 14-FL, a front right channel speaker 14-FR, a left surround channel speaker 14-BL, a right surround speaker 14-BR, and a subwoofer channel speaker (not shown). Since, as is well-known, a low range sound output from the subwoofer produces a weak localization effect, the low range sound is excluded from channels whose sound fields are to be processed. Accordingly, it is not shown also in FIG. 3.

As shown in FIG. 3A, in the automobile, the center channel speaker 14-C is disposed ahead of the driver's seat and the front passenger seat therebetween.

The front left channel speaker 14-FL is disposed ahead of the front passenger seat (the left side inside the automobile).

The front left channel speaker 14-FL is disposed ahead of the driver's seat (the right side inside the automobile).

The left surround channel speaker 14-BL is disposed posteriorly to a listening position $P_a$ ($P_b$) in the front passenger seat (the left side inside the automobile).

The right surround speaker 14-BR is disposed posteriorly to the listening position $P_a$ ($P_b$) in the driver's seat (the right side of the automobile).

The positional relationship between each of the speakers 14 and the listening position $P_a$ in the driver's seat is as shown in FIG. 3A.

As can be found from FIG. 3A, the distances from the speakers 14 to the listening position $P_a$ differ. This indicates that, even if the speakers 14 directly output sounds based of audio signals normally processed for surround sound, due to differences in distance cause differences in arrival times for the listening position $P_a$, creation of appropriate sound fields is difficult.

FIG. 3B shows the positional relationship between each of the speakers 14 and the listening position $P_b$ in the front passenger seat. The positions at which the speakers 14 are disposed are identical between FIGS. 3A and 3B. In the case of the listening position $P_b$, the distances from the speakers 14 to the listening position $P_b$ differ. Accordingly, for the same ground, it is difficult to obtain appropriate sound fields, even if the speakers 14 directly output sounds based on audio signals processed for surround sound.

The comparison between FIGS. 3A and 3B indicates that the listening position $P_a$ in the driver's seat and the listening position $P_b$ in the front passenger seat have different positional relationships with the five speakers 14.

For example, when comparing the distance between the listening position $P_a$ in the driver's seat and the right surround speaker 14-BR (in FIG. 3A), and the distance between the listening position $P_b$ in the front passenger seat and the right surround speaker 14-BR (in FIG. 3*b*), it is found that the former is smaller than the latter since the right surround speaker 14-BR is closer to the driver's seat.

Conversely, when comparing the distance between the listening position $P_a$ in the driver's seat and the left surround channel speaker 14-BL (in FIG. 3A) and the distance between the listening position $P_b$ in the front passenger seat and the left surround channel speaker 14-BL (in FIG. 3B), it is found that the former is greater than the latter since the left surround channel speaker 14-BL is closer to the driver's seat.

Since the center channel speaker 14-C is disposed between the driver's seat and the front passenger seat, the distance to the listening position $P_a$ and the distance to the listening position $P_b$ are equal to each other. However, a direction in which sound comes changes so as to change symmetrically with respect to the center line C along the longitudinal direction of the automobile.

A case in which sound-field correcting processing is executed, using, as target correcting positions, the listening position $P_a$ in the driver's seat and the listening position $P_b$ in the front passenger seat, shown in FIGS. 3A and 3B, is described below. Here, for brevity of description, a case in which time alignment is performed is schematically shown in FIGS. 4A and 4B.

Figure 4C:
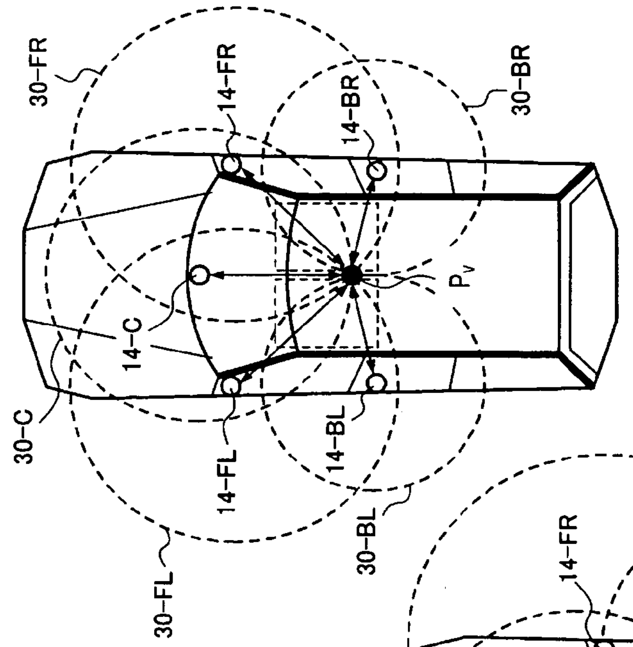
FIGS. 4A, 4B, and 4C are schematic top views each showing a state in which sound-field correction is performed by time alignment in the automobile.
Figure 4B:
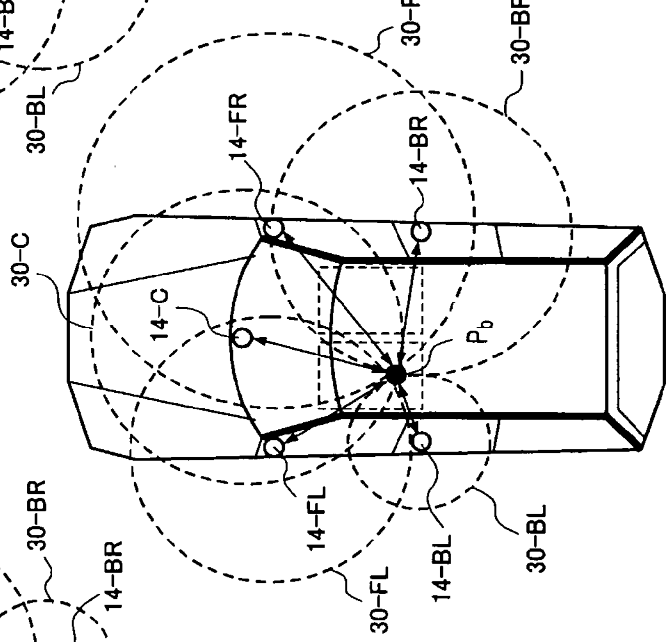
Figure 4A:
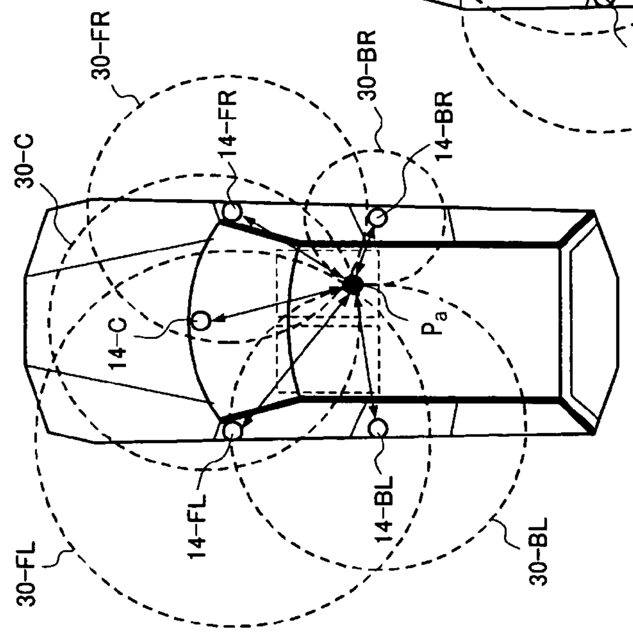

FIG. 4A shows a case in which sound-field correction is performed for the listening position $P_a$ in the driver's seat. In FIG. 4A, the wavefronts of sounds emitted at the same time from the speakers 14-C, 14-FL, 14-FR, 14-BL, and 14-BR are shown as wavefronts 30-C, 30-FL, 30-FR, 30-BL, and 30-BR.

FIG. 4A indicates that all the wavefronts 30-C, 30-FL, 30-FR, 30-BL, and 30-BR of the sounds emitted from the speakers 14-C, 14-FL, 14-FR, 14-BL, and 14-BR abut on the listening position $P_a$ at the same time. This indicates that the listening position $P_a$ is in a state of reproducing an appropriate sound field because sounds, based on surround-processed audio signals, emitted from the speakers 14-C, 14-FL, 14-FR, 14-BL, and 14-BR, simultaneously reach the listening position $P_a$.

Accordingly, as described above, based on distance information (correcting information) between the speaker corresponding to each channel and the listening position, the delay unit 111 sets a delay time for each audio channel. A delay time which is to be set in the channel for the speaker corresponding to the wavefront is relatively set so as to be shorter as the diameter of the wavefront increases and so as to be longer as the diameter of the wavefront decreases.

FIG. 4B shows a case in which sound-field correction is performed for the listening position $P_a$ in the driver's seat. FIG. 4B also shows that the listening position $P_b$ is in a state of reproduction of an appropriate sound field because sounds emitted from the speakers 14-C, 14-FL, 14-FR, 14-BL, and 14-BR simultaneously reach the listening position $P_b$.

The comparison between FIGS. 4A and 4B indicates that delay time setting of each audio channel greatly differs between the case of performing sound-field correction (time alignment) so that the listening position $P_a$ in the driver's seat has the optimal sound field, and the case of performing sound-field correction so that the listening position $P_b$ in the front passenger seat has the optimal sound field. For example, regarding the left surround channel speaker 14-BL and the right surround speaker 14-BR, the wavefronts 30-BL and 30-BR shown in FIGS. 4A and 4B indicate that the delay time setting greatly differs between the case of sound-field correction for the listening position $P_a$ and the case of sound-field correction for the listening position $P_b$.

This indicates that, when sound-field correction is performed for the listening position $P_a$ in the driver's seat, as shown in FIG. 4A, the listening position $P_b$ in the front passenger seat does not have any appropriate sound field, and that, conversely, when sound-field correction is performed for the listening position $P_b$ in the front passenger seat, the listening position $P_a$ in the driver's seat does not have any appropriate sound field. In other words, sound-field correction is originally to enable an appropriate sound field at a correcting position, and it is difficult to obtain appropriate sound fields in other positions. This is said to be unavoidable.

When the user actually listens to surround sound in the AV system 1 while being in the automobile, if the user sets a state with sound-field correction performed for, for example, the listening position $P_a$ in the driver's seat, a passenger at the listening position $P_b$ in the front passenger seat naturally hears sound having a considerably distorted sound field, so that it is difficult for the passenger in the front passenger seat to feel comfortable.

In such a case in which the automobile has not only the driver in the driver's seat but also a passenger in the front passenger seat, and remarkable imbalance occurs in the formation of sound fields on both seats, for solution, a measure is possible in which sound-field correction is performed for a position in an intermediate range between the listening position $P_a$ in the driver's seat and the listening position $P_b$ in the front passenger seat. This is because, in either listening position in the driver's seat or the front passenger seat, a sound field improved to some extent can be obtained.

FIG. 4C shows a case in which, assuming that there is a listening position $P_v$ substantially between the listening position $P_a$ in the driver's seat and the listening position $P_b$ in the front passenger seat, time alignment sound-field correction is performed for the listening position $P_v$.

If the sound-field correction is performed as shown in FIG. 4C, in either the listening position $P_a$ or the listening position $P_b$, it is difficult to reproduce the optimal sound field. However, when comparing the above case with a case in which sound-field correction is performed so that the optimal sound field can be obtained only in one of the listening position $P_a$ (FIG. 4A) and the listening position $P_b$ (FIG. 4B), it is found that, in the above case, a better sound field is obtained. In addition, in this case, differences in arrival time of the sounds from the speakers 14 are approximately equal symmetrically with the center line C. Thus, the listening position $P_a$ and the listening position $P_b$ have approximately equal deteriorations in sound field.

By performing sound-field correction in a state in which a correcting position is set between the listening position $P_a$ in the driver's seat and the listening position $P_b$ in the front passenger seat in the above manner, an intermediate sound field, which serves as a middle ground satisfying both, can be obtained although it is difficult to set a sound field that a listener in the driver's seat and a sound field that a listener in the driver's seat to be completely appropriate. In addition, this indicates that, in another viewpoint, a position at which an appropriate sound field can be obtained is not a pinpoint but is expanded to some positional range. Actually, this use is easily expected.

In this embodiment, in view of the above points, by using, as a target correcting position, a position other than the originally registered correcting position (normal correcting position), sound-field correction can be conveniently performed with a high degree of freedom, whereby a higher utility value of sound-field correction can be obtained. This point is described below.

In this embodiment, at least two positions in the automobile are registered as the above-described normal correcting positions, that is, correcting positions at which correcting information is obtained by actual measurement or the like. In this stage, for brevity of description, there are two normal correcting positions to be registered, and they are the listening position $P_a$ in the driver's seat and the listening position $P_b$ in the front passenger seat, respectively.

Registration of a normal correcting position is performed by actually installing the microphone 16 as a position to be used as a normal correcting position, performing measurement, and storing correcting information of the position in the memory 18.

In addition, regarding measurement for the actual registration, measurement is sequentially performed for each normal correcting position. In addition, for example, depending on the configuration of the frame buffer 21, by installing a plurality of microphones at positions which are to be used as normal correcting positions, measurement may be simultaneously performed.

In this embodiment, after two normal correcting positions are registered as described above, a user operation can designate a correcting position in a positional range having the two normal correcting positions as end points. In other words, this embodiment enables an operation of designating a correcting position (target correcting position) which is subject to actual correction and in which the sound-field correcting block 110 executes sound-field correction. In this embodiment, this designating operation is realized by the user interface 19.

Figure 5:
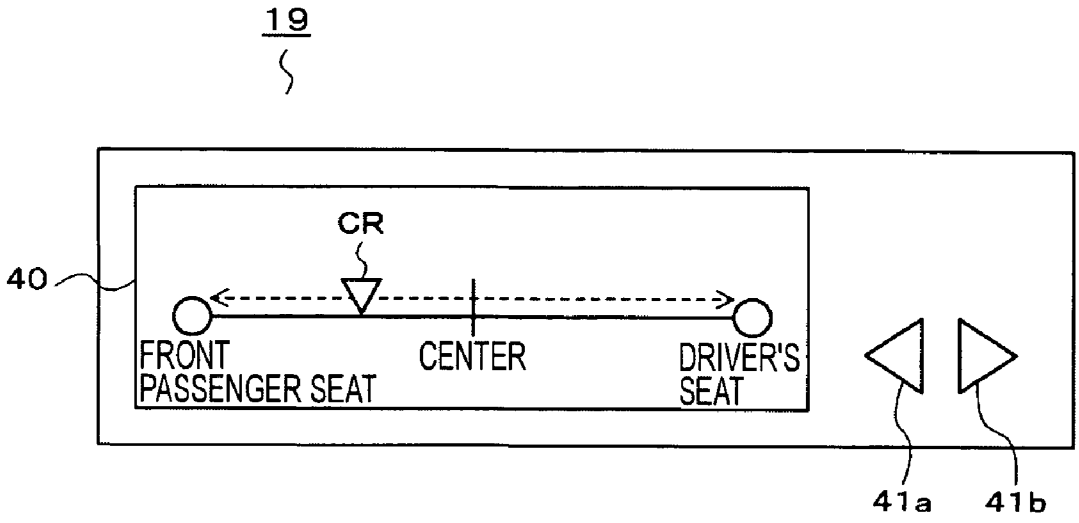
FIG. 5 is an illustration of an example of a user interface for sound-field adjustment.

FIG. 5 shows an example of an exterior view of a panel portion which is provided, as the user interface 19 for designating the target correcting position, so as to be displayed in the inside of the automobile. The panel portion of the user interface 19 shown in FIG. 5 includes a display section 40 and cursor moving buttons 41*a* and 41*b* as handlers.

In the display section 40 shown in FIG. 5, the listening position in the driver's seat and the listening position in the front passenger seat, which are registered as normal correcting positions, are respectively displayed at right and left ends in symbol form. A cursor CR is displayed between the symbolically displayed driver's seat and front passenger seat. The cursor CR indicates the correcting position by using a distance-and-positional relationship between the driver's seat and the front passenger seat. The cursor CR can be moved to the left front passenger seat side as indicated by the broken line in the display section 40 in response to an operation on the cursor moving button 41*a*. The cursor CR can be moved to the right driver's seat side in response to an operation on the cursor moving button 41*b*. Regarding limits of moving the cursor CR by operating the cursor moving buttons 41*a* and 41*b*, the cursor CR can be moved left to the symbolically displayed front passenger seat, and can be moved right to the symbolically displayed driver's seat.

As described above, the position of the cursor CR displayed in the display section 40 allows the user to recognize where the presently designated target correcting position is located. In addition, by operating the cursor moving buttons 41*a* and 41*b* to move the cursor CR, also the actual target correcting position can be accordingly changed to move.

In this embodiment, the optimal sound field is set, at the correcting position in the actual automobile, which corresponds to the position of the cursor CR displayed in the display section 40, as the sound field obtained by the sound-field correction by the sound-field correcting block 110. In addition thereto, in response to moving the cursor CR by operating the cursor moving buttons 41*a* and 41*b*, the correcting position at which the optimal sound field can be obtained in the actual automobile can be moved.

The user's operation of changing the correcting position is that a position at which an appropriate sound field can be obtained is adjusted. Thus, this is referred to as "sound-field adjustment".

In a user's view of the configuration of the above user interface 19, as long as at least two normal correcting positions have been registered, in a predetermined space range including the correcting positions, a very simplified operation, that is, a cursor moving operation on the user interface 19, can change sound-field correction setting.

In the related art, sound-field correction is performed only for positions corresponding to the normal correcting positions, at which correcting information is obtained by performing, for example, actual measurement. This is because, in sound-field correction of the related art, sound-field correction is performed, with a predetermined signal processing parameter set based on acquired correcting information. Specifically, in the related art, if, for example, a listening position in the driver's seat, and a listening position in the front passenger seat are registered and correcting information on these listening positions are acquired, sound-field correction that is optimal to one of the two normal correcting positions (the listening positions in the driver's seat and the front passenger seat) can only be performed. Accordingly, in the case of acquiring a state of sound-field correction which is optimal at, for example, an intermediate position between the listening position in the driver's seat and the listening position in the front passenger seat, it is necessary to acquire correcting information by performing measurement at the intermediate position.

Conversely, in this embodiment, by simply registering, for example, two normal correcting positions, an arbitrary position (target correcting position) that serves as the optimal sound field in a predetermined positional range can be selected. In addition, despite a feature in that selection of a target correcting position has sequentiality and gradualness, by providing the selection with arbitrariness, the following advantage is also obtained.

In other words, in the case of setting, for example, a sound field of compromise between the listening position in the driver's seat and the listening position in the front passenger seat, it may be appropriate that, in the simplest method, a position in an intermediate part between the listening position in the driver's seat and the listening position in the front passenger seat is set, in a pinpoint manner, as an target correcting position. However, when a sound field actually formed at this position is listened to at the listening position in the driver's seat and the listening position in the front passenger seat, it is not necessarily the case that the actually formed sound field is a sound field of compromise which satisfies, in auditory sense, both the persons in the driver's seat and the front passenger seat. Accordingly, a better sound field may be obtained by setting the sound field closer to either seat. In addition, it is naturally possible that, depending on the situation, the sound field be preferably set closer to the driver's seat or the front passenger seat. In other words, a target correcting position at which a sound field of compromise can be obtained will be changed depending on the situation or the like. In the related art, it is difficult for the sound-field correction to response to the situation, and time-consuming re-measurement needs to be performed. Conversely, in this embodiment, an operation on the user interface 19 can immediately respond to the situation.

From the above, it may be said that, in this embodiment, selection of a position for use as the optimal sound field in sound-field correction is less time-consuming and simpler compared with the related art and has higher flexibility. Designation of the above target correcting position is performed by using, for example, the user interface 19 shown in FIG. 5.

Figure 6:
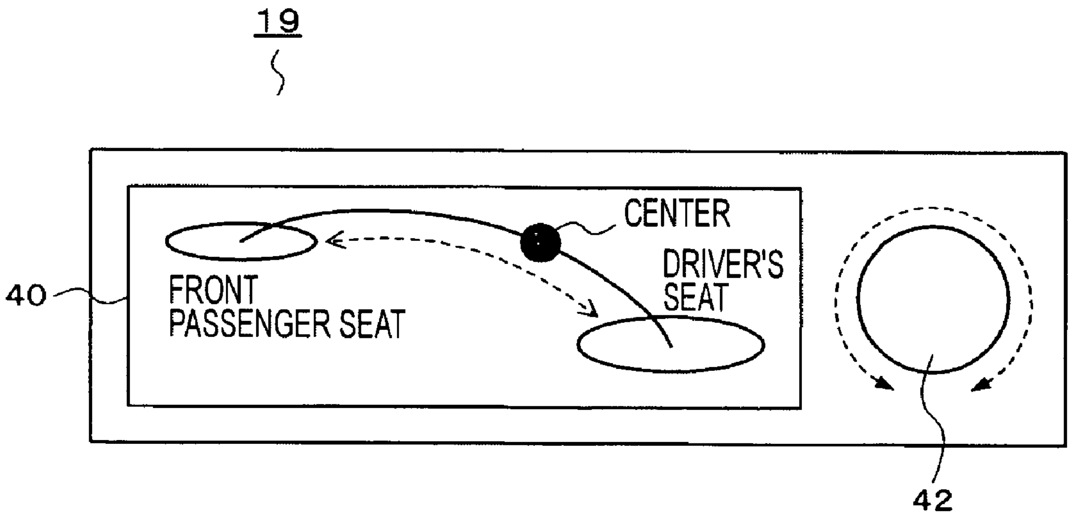
FIG. 6 is an illustration of an example of a user interface for sound-field adjustment.

Similarly to the case of FIG. 5, FIG. 6 shows an example of a panel form as an example of the user interface 19, which arbitrarily designates a target correcting position between the listening position in the driver's seat and the listening position in the front passenger seat, which are normal correcting positions.

Also in the display section 40 shown in FIG. 5, an example of a display form different from that shown in FIG. 5 symbolically indicates the listening position in the driver's seat and the listening position in the front passenger seat. Also in this case, the cursor CR, which indicates the designated position as the target correcting position by using the positional relationship between the listening position in the driver's seat and the listening position in the front passenger seat, can be moved, as indicated by the broken line arrows in the display section 40, between the symbol of the listening position in the driver's seat and the symbol of the listening position in the front passenger seat.

In the case in FIG. 5, a handler for moving the cursor CR is a dial 42. When turning the dial 42 to the right (clockwise) through the end, the cursor CR is positioned at the listening position in the driver's seat. Conversely, when turning the dial 42 to the left (anticlockwise) through the end, the cursor CR is positioned at the listening position in the front passenger seat. By turning the dial 42 in this rotatable range, the cursor CR can be moved between the symbol of the listening position in the driver's seat and the symbol of the listening position in the front passenger seat in accordance with an angle of rotation of the dial 42. Also in this case, in accordance with the position of the cursor CR, the target correcting position (a position at which the optimal sound field is obtained) in the actual inside of the automobile is moved between the listening position in the driver's seat and the listening position in the front passenger seat.

In this embodiment, the user interface 19 for changing and designating the target correcting position may have various types other than the types shown in FIGS. 5 and 6. In addition, in FIGS. 5 and 6, only items necessary for sound-field adjusting operation are shown. The display section 40 may display graphics, text, etc., for a purpose other than the sound-field adjustment. Moreover, regarding the handler provided on the panel of the user interface 19, actually, those which are to be used for the purpose other than the sound-field adjustment may be provided, if necessary.

Next, a configuration for performing sound-field correction in accordance with the target correcting position designated by using the user interface 19 shown in FIG. 5 or 6 is described below.

In addition, in this embodiment, as can be understood from FIG. 2, in which the sound-field correcting block 110 includes the delay unit 111, the equalizing unit 112, and the gain adjusting unit 113, signal processing for sound-field adjustment can change a signal delay time, equalizing, and gain (volume). For brevity of the following description, only the delay time setting by the delay unit 111 is described as the sound-field correction.

Figure 7:
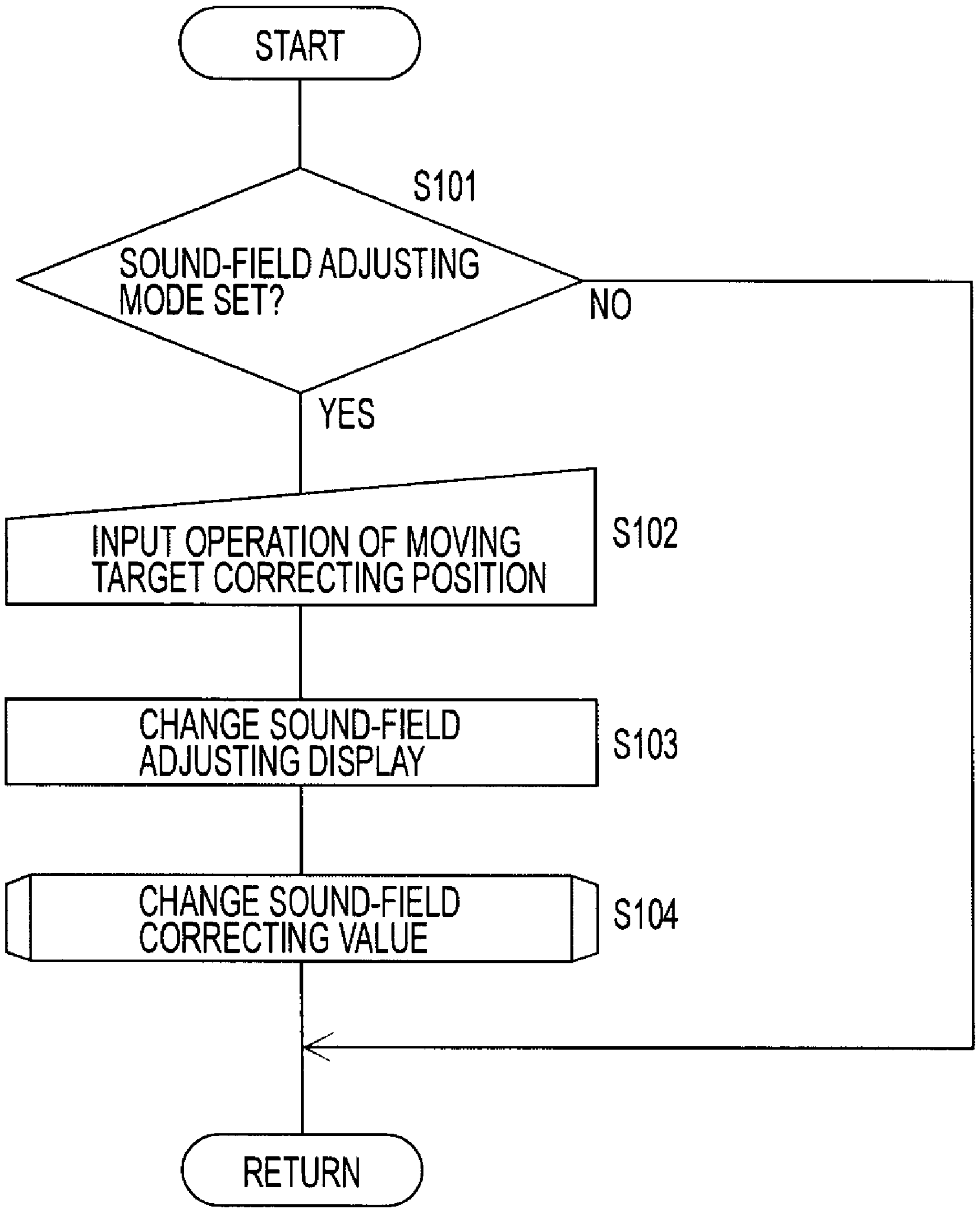
FIG. 7 is a flowchart showing a sound-field adjusting process.

The flowchart shown in FIG. 7 shows a process for performing sound-field correction in response to sound-field adjustment. The process shown in FIG. 7 is executed by the controller 17 in accordance with, for example, a program stored in an internal ROM.

In step S101, the controller 17 determines whether or not the sound-field adjusting mode is set. If, in step S101, the controller 17 has determined that the sound-field adjusting mode is not set, the process ends. Conversely, if, in step S101, the controller 17 has determined that the sound-field adjusting mode is set, the process proceeds to step S102.

Setting and cancellation of the sound-field adjusting mode are performed by performing a user's predetermined operation on the user interface 19.

In the sound-field adjusting mode, the controller 17 controls, for example, the user interface 19 to execute a display control process for displaying the display section 40 for sound-field adjustment, as shown in FIG. 5 or FIG. 6. After that, in step S102, an operation on the user interface 19 of moving a target correcting position is input to the controller 17. In other words, in the case of FIG. 5 or 6, the controller 17 can capture operation information corresponding to an operation on the handler for moving the cursor CR indicating the target correcting position.

In step S103, based on the operation information captured in step S102, the sound-field adjusting display on the display section 40 is changed. In other words, for example, in the case of FIG. 5 or FIG. 6, in response to the operation of moving the target correcting position, the sound-field adjusting display is formed so that the cursor CR is moved.

In step S104, based on the operation information captured in step S102, a sound-field correcting value is changed so that the optimal sound field is obtained at a new target correcting position set in response to the operation of moving the target correcting position. The sound-field correcting value is the value of a signal delay time for each audio channel set in the delay unit 111.

Figure 8:
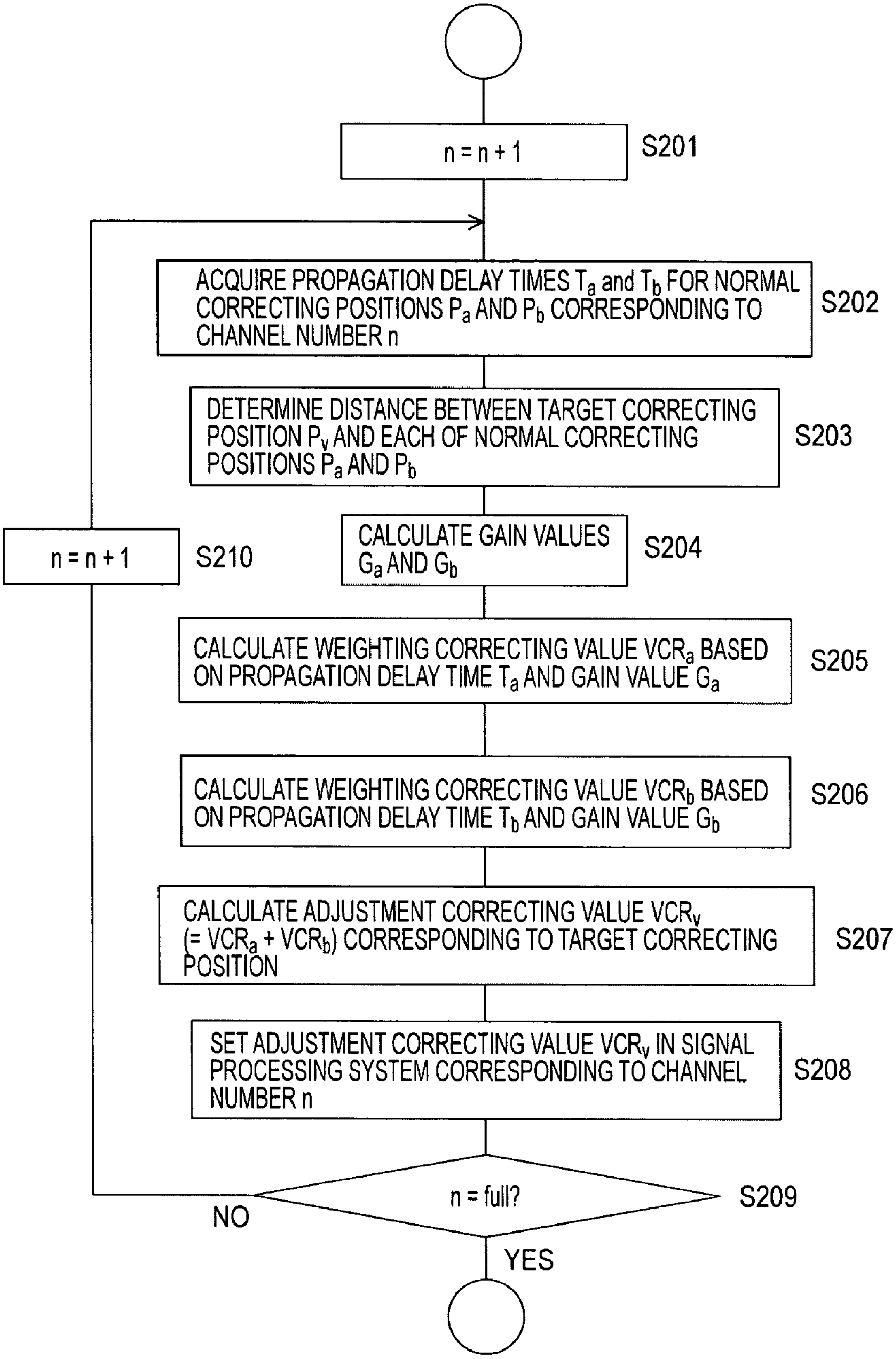
FIG. 8 is a flowchart showing a process for changing a correcting value for sound-field correction.

The flow of the process in step S104 for changing the sound-field correcting value is shown in the flowchart shown in FIG. 8.

In step S201, an initial value of 1 is set as variable n representing an audio channel number. In the case of 5.1-channel surround system, five channels, that is, a center channel (C), a front left channel (FL), a front right channel (FR), a left surround channel (BL), and a right surround channel (BR), excluding a subwoofer channel, are subject to signal processing for sound-field correction. Accordingly, in this case, for example, audio channel numbers (channel numbers) 1 to 5 are given to the above five audio channels.

Here, as described above, it is assumed that, in this embodiment, after registering two normal correcting positions at first, correcting information on the normal correcting positions has already been obtained. For brevity of description, the correcting information on each normal correcting position is, when sounds are output from speakers corresponding to the audio channels, a time difference between a time that each sound is output and a time that the sound reaches the normal correcting position. Here, this time difference is referred to as a "propagation delay time" of sound from the speaker to the normal correcting position.

Figure 10:
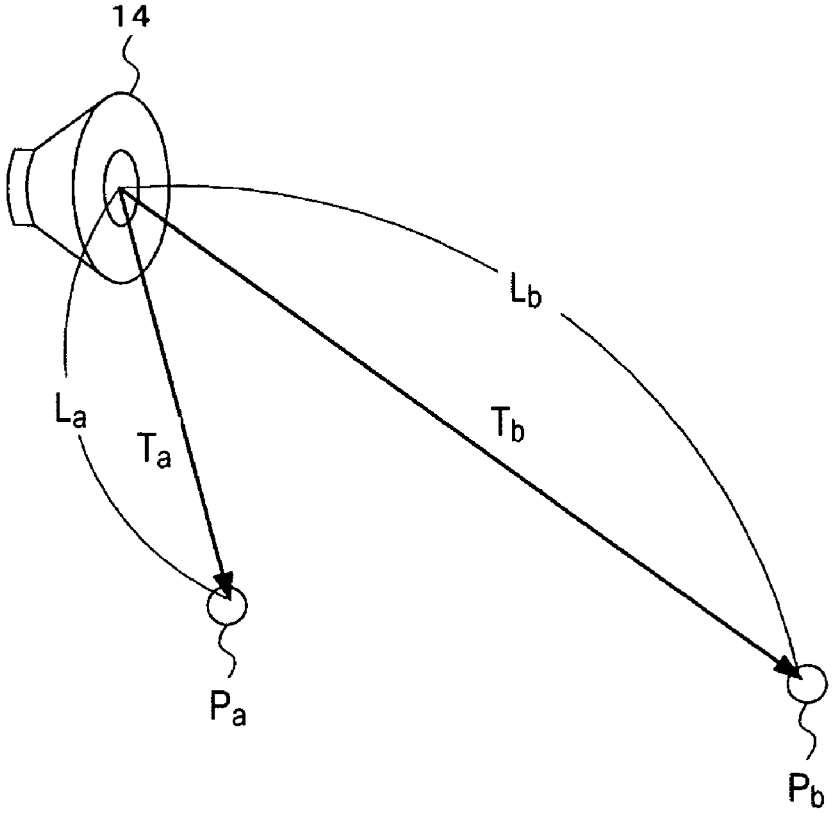
FIG. 10 is an illustration of a relationship between the distance to a speaker between two normal correcting positions and a propagation delay time of sound.

In other words, as shown in FIG. 10, two normal correcting positions $P_a$ and $P_b$ at different space positions are determined such as the listening position in the driver's seat and the listening position in the front passenger seat. Then, for each of the normal correcting positions $P_a$ and $P_b$, each of distances $L_a$ and $L_b$ to the speaker 14, which corresponds to a certain audio channel, is set. As described above, depending on the type of the measuring block 103, information of the distance between the speaker 14 and the microphone 16 (the normal correcting positions) can be obtained by performing measurement using an impulse response. In addition, from the information of the distances $L_a$ and $L_b$, the propagation delay times $T_a$ and $T_b$ can be calculated by using an arithmetic parameter such as sound velocity. In other words, the values of the distances $L_a$ and $L_b$ are obtained as the results of acoustic measurement, whereby the propagation delay times $T_a$ and $T_b$ are directly and exclusively acquired.

Here, the value of a propagation delay time for the speaker corresponding to each audio channel, which is subject to signal processing for sound-field correction, is obtained as the correcting information on each of the normal correcting positions $P_a$ and $P_b$. Specifically, in the case of the 5.1-channel surround system, the correcting information on the normal correcting position $P_a$ is formed by information of five propagation delay times, that is, propagation delay time $T_a$ (C) from the center channel speaker 14-C to the normal correcting position $P_a$, propagation delay time $T_a$ (FL) from the front left channel speaker 14-FL to the normal correcting position $P_a$, propagation delay time $T_a$ (FR) from the front right channel speaker 14-FR to the correcting position $P_a$, propagation delay time $T_a$ (BL) from the left surround channel speaker 14-BL to the normal correcting position $P_a$, and propagation delay time $T_a$ (BR) from the right surround speaker 14-BR to the normal correcting position $P_a$.

Similarly, the correcting information on the normal correcting position $P_b$ is formed by information of five propagation delay times, that is, $T_b$ (C), $T_b$ (FL), $T_b$ (FR), $T_b$ (BL), and $T_b$ (BR).

In this embodiment, the correcting information on the normal correcting positions $P_a$ and $P_b$ is stored in the memory 18 so that the channel number assigned to each audio channel beforehand is associated with the correcting information.

Referring to FIG. 8, in step S202, from the memory 18, the propagation delay times $T_a$ and $T_b$ for the normal correcting positions $P_a$ and $P_b$, which correspond to the presently set channel number, are read and acquired. For example, it is assumed that the channel number is one, and the channel number corresponds to the center channel (C). In this case, in step S202, from the memory 18, the propagation delay time $T_a$ (C) for the normal correcting position $P_a$, which is associated with the center channel (C), and the propagation delay time $T_b$ (C) for the normal correcting position $P_b$, which is similarly associated with the center channel (C), are read and acquired.

In addition, a moved target correcting position $P_v$ is specified, based on operation information corresponding to an operation on the user interface 19, in processing corresponding to step S102 in FIG. 7. Accordingly, in step S203, each distance between the moved target correcting position $P_v$ and each of the normal correcting positions $P_a$ and $P_b$ is determined. In other words, positional relationships of the moved target correcting position $P_v$ with the normal correcting positions $P_a$ and $P_b$ are determined.

In step S204, gain values $G_a$ and $G_b$ are calculated by using the results of determination in step S203.

Here, in a case in which, when the normal correcting positions $P_a$ and $P_b$ are used as end points, the optimal sound field is to be formed for the moved target correcting position $P_v$ in an intermediate range therebetween, correcting values (propagation delay times), obtained based on the correcting information on the normal correcting positions $P_a$ and $P_b$, are respectively weighted so as to be associated with the positional relationship between the target correcting position $P_v$ and each of the normal correcting positions $P_a$ and $P_b$. In this case, the positional relationship may be understood as a ratio between the distance between the normal correcting position $P_a$ and the target correcting position $P_v$, and the distance between the normal correcting position $P_b$ and the target correcting position $P_v$. By summing the weighted correcting values, a correcting value corresponding to the target correcting position $P_v$ may be set.

The gain values $G_a$ and $G_b$ calculated in step S204 respectively represent weighting values to be set for correcting values at the normal correcting positions $P_a$ and $P_b$. Gain values $G_a$ and $G_b$ can be represented by, for example, $G_a=1-\alpha$, $G_b=\alpha$, and $\alpha=0$ to 1. The value of $\alpha$ in this case corresponds to the ratio of the distance between the normal correcting position $P_a$ and the target correcting position $P_v$ to the distance between the normal correcting positions $P_a$ and $P_b$.

In step S205, weighting correcting value $VCR_a$ is calculated by using the propagation delay time $T_a$, at the normal correcting position $P_a$, read in step S202, and the gain value $G_a$ calculated in step S204.

For the calculation, the propagation delay time $T_b$, for the normal correcting position $P_a$, read in step S202, and the gain $G_a$ calculated in step S204 are used. At first, based on the propagation delay time $T_a$, a delay time to set is directly and exclusively found. By multiplying the calculated delay time and the gain $G_a$, the weighting correcting value $VCR_a$ can be obtained. As can be understood from this description, the weighting correcting value $VCR_a$ is obtained by weighting the correcting value at the normal correcting position $P_a$ in accordance with the distance between the normal correcting position $P_a$ (between the normal correcting positions $P_a$ and $P_b$) and the target correcting position $P_v$.

In step S206, similarly to the above, weighting correcting value $VCR_b$ is calculated which is obtained by weighting the correcting value at the normal correcting position $P_b$ in accordance with the distance between the normal correcting position $P_b$ (between the normal correcting positions $P_a$ and $P_b$) and the target correcting position $P_v$.

In step S207, by using the weighting correcting values $VCR_a$ and $VCR_b$ calculated in steps S205 and S206, adjustment correcting value $VCR_v$ for forming the optimal sound field at the target correcting position $P_v$ is calculated based on the expression $VCR_v=(VCR_a+VCR_b)$.

In step S208, the adjustment correcting value $VCR_v$ obtained in step S207 is set in a signal processing system of the audio channel corresponding to the present channel number n. Since, in this case, the adjustment correcting value $VCR_v$ is a signal delay time, in the delay unit 111, the delay time represented by the adjustment correcting value $VCR_v$ is set in the delay element of the audio channel represented by the present channel number n.

After step S208 finishes, in step S209, the controller 17 determines whether or not the present value of variable n representing the channel number is the maximum. Here, it is assumed that the controller 17 negatively determines since the present value of variable n is not the maximum. That the present value of variable n is not the maximum indicates that there remaining audio channels. Accordingly, in this case, the process proceeds to step S210, variable n is incremented by one, as indicated by the expression n=n+1, and returns to step S202 and thereafter. This calculates adjustment correcting value $VCR_v$ (delay time) for each of the remaining audio channels, and the calculated adjustment correcting value $VCR_v$ is set in each delay element.

By repeatedly performing steps S202 to S210, affirmative determination in step S209 in which the present value of variable n is the maximum is obtained. In this stage, for all the audio channels, delay times, each of which is adjustment correcting value $VCR_v$, are set in the delay elements. At this time, the optimal sound field at the target correcting position is formed.

Figure 9:
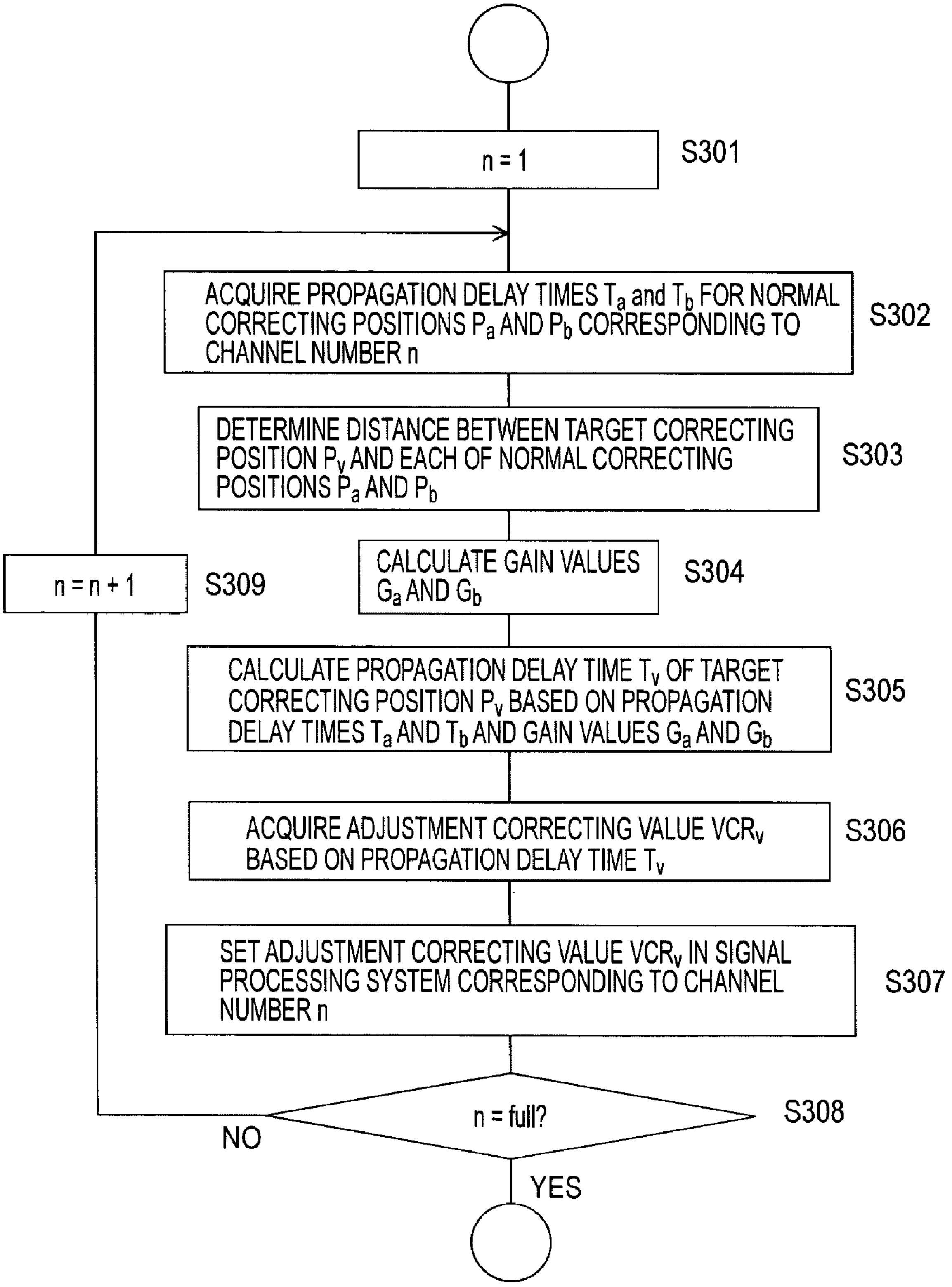
FIG. 9 is a flowchart showing another example of the process for setting a change in correcting value for sound-field correction.

The flowchart shown in FIG. 9 shows another example of the process for changing the sound-field correcting value in step S104. The process shown in FIG. 9 differs from that in FIG. 8 in a step of calculating adjustment correcting value $VCR_v$.

In FIG. 9, a description of steps S301 to S304 is omitted since they are identical to steps S201 to S204 shown in FIG. 8.

In step S305, based on propagation delay times $T_a$ and $T_b$ at normal correcting positions $P_a$ and $P_b$, which correspond to the present channel, and which are acquired in step S302, and gain values $G_a$ and $G_b$ calculated in step S304, propagation delay time $T_v$ for the target correcting position $P_v$ is obtained by calculation.

The propagation delay time $T_v$ can be calculated by, for example, the expression $T_v=(T_a \times G_a)+(T_b \times G_b)$. In other words, in this case, by weighting the propagation delay times $T_a$ and $T_b$ of the normal correcting positions $P_a$ and $P_b$ in accordance with the positional relationship (distance ratio) between each of the normal correcting positions $P_a$ and $P_b$ and the target correcting position $P_v$, and summing the weighted values, without weighting correcting values, propagation delay time $T_v$, which is an arrival time of sound from the speaker 14 (for the present channel) to the target correcting position $P_v$, is calculated.

In step S306, adjustment correcting value $VCR_v$ is acquired based on the calculated propagation delay time $T_v$. As already described above, a correcting value (delay time in delay element) for a propagation delay time is directly and exclusively found. Thus, by finding the propagation delay time, a correcting value corresponding thereto can be found. The adjustment correcting value $VCR_v$ obtained in step S306 has a delay time value which is to be set for the present audio channel in order for the presently designated target correcting position $P_v$ to be the optimal sound field.

In step S307, similarly to step S208 in FIG. 8, the adjustment correcting value $VCR_v$ obtained in step S306 is set in the correcting signal processing system (the delay element of the delay unit 111) of the audio channel corresponding to the present channel number n.

Steps S308 and S309 in FIG. 9 are identical to steps S209 and S210 in FIG. 8. Also in this case, in a stage in which affirmative determination in step S309 is obtained, the delay time, which is adjustment correcting value $VCR_v$, is set in the delay element for each of all the audio channels, and the optimal sound field at the target correcting position $P_v$ designated that time is formed.

Regarding detailed technique and processes for calculating adjustment correcting value $VCR_v$, for each audio channel, corresponding to target correcting value $P_v$, the processes shown in FIGS. 8 and 9 are only examples, and other techniques and processes may be employed.

In the foregoing description, at least two normal correcting positions are registered, that is, correcting information of two positions is acquired. The correcting information of two positions is obtained such that the sound-field correcting/measuring function unit 22 performs actual acoustic measurement.

However, in the present invention, the correcting information of two normal correcting positions can be obtained by the following.

At first, between two correcting positions, correcting information of one normal correcting position is obtained by actual acoustic measurement. In addition, correcting information of the other normal correcting position is acquired by performing, for example, arithmetic processing based on a listening environment in which sound fields are reproduced by the AV system 1 according to this embodiment, whereby the correcting information is treated as registered. This point is described below again with reference to FIGS. 3A and 3B, and 4A to 4C.

Here, it is assumed that two normal correcting positions $P_a$ and $P_b$ are the listening position in the driver's seat and the listening position in the front passenger seat, as shown in FIGS. 3A and 3B, and 4A to 4C. In addition, in this case, it is assumed that correcting information (propagation delay time) is obtained by performing actual measurement at the normal correcting position $P_a$, which is the listening position in the driver's seat.

In this case, the other normal correcting position $P_b$ is the listening position in the front passenger seat, and it is found from the common structure of the automobile's inside that the listening position in the driver's seat and the listening position in the front passenger seat are substantially symmetric with respect to the center line C along the longitudinal direction of the automobile. In addition, regarding the arrangement of the speakers 14, the center channel speaker 14-C is disposed on the center line C, the front left channel speaker 14-FL and the front right channel speaker 14-FR are symmetric with respect to the center line C, and the left surround channel speaker 14-BL and the right surround speaker 14-BR are symmetric with respect to the center line C. In other words, also the arrangement of the speakers 14 is symmetric.

From this feature, regarding the correcting information (propagation delay time) of the normal correcting position $P_b$ which is the listening position in the front passenger seat, a considerably highly reliable value can be easily obtained from the correcting information (propagation delay time) for the normal correcting position $P_a$ as the listening position in the driver's seat, which has symmetry, without performing actual measurement.

Specifically, the distance between the normal correcting position $P_a$ (the listening position in the driver's seat) and right surround speaker 14-BR shown in FIG. 3A is substantially equal to the distance between the normal correcting position $P_b$ (the front passenger seat in the front passenger seat) and left surround channel speaker 14-BL (symmetric to the right surround speaker 14-BR by the center line C) shown in FIG. 3B. Thus, it may be said that their propagation delay times are also equal.

Conversely, the distance between the normal correcting position $P_a$ (the listening position in the driver's seat) and left surround channel speaker 14-BL shown in FIG. 3A is substantially equal to the distance between the normal correcting position $P_b$ (the listening position in the front passenger seat) and right surround speaker 14-BR (symmetric to the right surround speaker 14-BR by the center line C) shown in FIG. 3B. Thus, their propagation delay times are also equal.

This similarly applies to combinations of distances among the normal correcting positions $P_a$ and $P_b$, the front left channel speaker 14-FL, and the front right channel speaker 14-FR. In addition, regarding the center channel speaker 14-C, an arrival direction of sound symmetrically differs between the normal correcting positions $P_a$ and $P_b$, but an arrival distance of sound is equal between both points. Thus, propagation delay times from the center channel speaker 14-C to the normal correcting positions $P_a$ and $P_b$ are also equal.

On the assumption that there is symmetry, it is to be understood that, based on correcting information on the normal correcting position $P_a$ (the listening position in the driver's seat), correcting information on the normal correcting position $P_b$, which has a contrastive condition, can be acquired by processing and calculation in accordance with a simple algorithm.

In the above manner, based on correcting information on a particular normal correcting position, which is already acquired, by finding correcting information on another normal correcting position, the number of listening positions at which acoustic measurement is to be performed is reduced. Thus, a time-consuming operation is lightened for the user.

For the thus obtained correcting information, accuracy by which sound fields practically satisfying the user are formed can be given, although the correcting information is less accurate when compared with actually measured correcting information.

Moreover, when a model of an automobile in which the AV system 1 according to this embodiment is installed is known beforehand, and the listening position in the driver's seat and the listening position in the front passenger seat are set as two normal correcting positions $P_a$ and $P_b$, it is possible that correcting information on the two normal correcting positions $P_a$ and $P_b$ which is found beforehand be stored as preset information in the memory 18 by factory default. In addition, by using only correcting information on one of the two normal correcting positions $P_a$ and $P_b$ as the correcting information stored as preset information in the memory 18, the other normal correcting position can be acquired (for registration) by processing and calculation in accordance with a predetermined algorithm by using the correcting information on the one normal correcting position.

In the foregoing description, in the automobile, the listening position in the driver's seat and the front passenger seat in the front passenger seat are used as normal correcting positions, respectively. In the present invention, a combination of positions other than the above listening positions may be used as a combination of normal correcting positions, and, in this combination, the above-described sound-field correction can be performed. For example, by using, as normal correcting positions, the listening position in the driver's seat or front passenger seat and one predetermined listening position on a backseat, intermediate sound-field correction between the normal correcting positions can be performed.

In addition, the number of registered normal correcting positions is not limited to only two but may be three or more. By way of example, assuming that the automobile is five-seated, five listening positions, that is, a driver's seat, a front passenger seat, a left side of a backseat, a right side of the backseat, and the center of the backseat, can be registered as normal correcting positions, respectively.

Also in this case, in order to obtain correcting information on these normal correcting positions, in each normal correcting position, actual acoustic measurement may be performed. In addition, for example, in a positional relationship among the driver's seat, the front passenger seat, the backseat, and positions at which the speakers 14 are disposed, regularity, such as a certain amount of symmetry, can be found. Thus, in this case, based on correcting information on a particular normal correcting position, correcting information on the other normal correcting positions can be found.

When the number of normal correcting positions is two, as schematically shown in FIGS. 5 and 6, and target correcting position is linearly moved between the two normal correcting positions $P_a$ and $P_b$. In addition, when three or more normal correcting positions are registered as described above, the target correcting position moves in a positional range including the three or more normal correcting positions. Thus, the movement of the target correcting position is two-dimensional.

In order to acquire correcting information on the target correcting position, which is designated by two-dimensional movement, in the positional range including the three or more normal correcting positions, in accordance with the processing already described in FIGS. 8 and 9, the acquisition can be performed by performing weighting in accordance with the positional relationship between each of the three or more normal correcting positions and the target correcting position, a distance ratio, etc., and performing calculation such as combination of vectors.

Examples of the user interface 19 which match the case of two-dimensionally moving the target correcting position in the above manner are shown in FIGS. 11 to 15. Similarly to FIGS. 5 and 6, FIGS. 11 to 15 also show exterior forms of the user interface 19.

Figure 11:
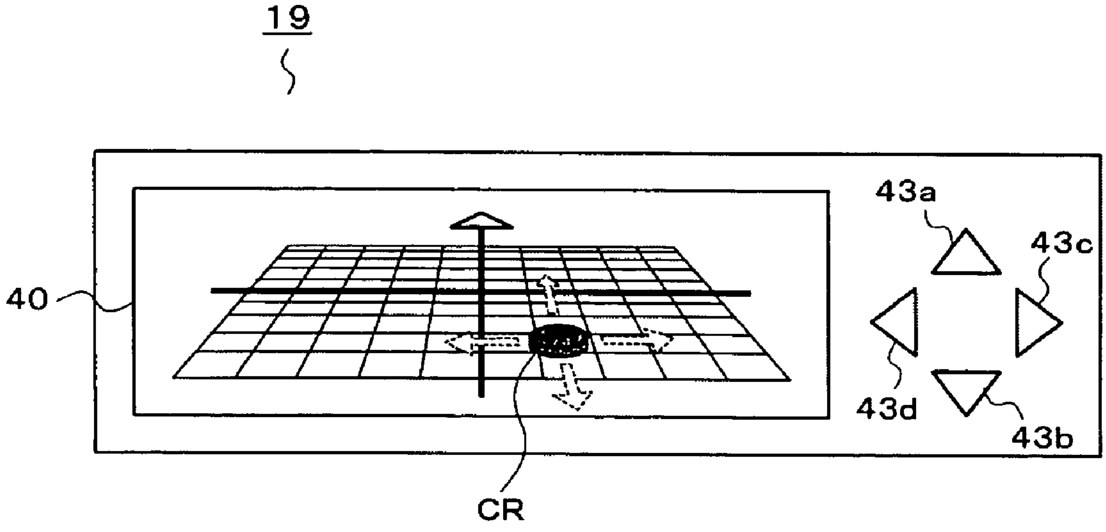
FIG. 11 is an illustration of an example of a user interface for sound-field adjustment.

Referring to FIG. 11, the display section 40 displays a scale indicated as an image obtained when a coordinate plane is viewed from slightly up in the back of the automobile, and the cursor CR is disposed so as to float on the scale. In other words, the scale and the cursor CR are displayed in the form of a three-dimensional space. The cursor CR can be moved in the three-dimensional space from front to back and from side to side in response to operations on cursor moving keys 43*a*, 43*b*, 43*c*, and 43*d*.

Figure 12:
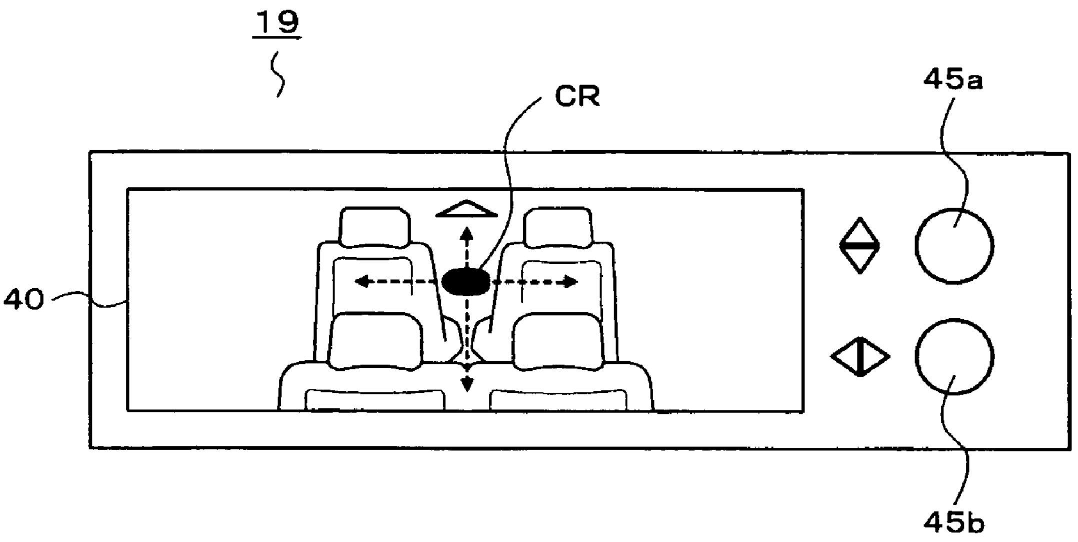
FIG. 12 is an illustration of an example of a user interface for sound-field adjustment.

Referring to FIG. 12, the display section 40 three-dimensionally displays the inside of the automobile in a form viewed from posteriorly to the backseat. Also in this case, the cursor CR is displayed so as to float in the inside of the automobile which looks as the three-dimensional space. The cursor CR can be moved from front to back and from side to side by operating cursor moving dials 45*a* and 45*b*.

The cursor moving dial 45*a* is used for movement from front to back. For example, by anticlockwise turning the cursor moving dial 45*a*, the cursor CR is moved to front, and, by clockwise turning the cursor moving dial 45*a*, the cursor CR is moved to back. The relationship between the turning direction of the cursor moving dial 45*a* and the movement direction of the cursor CR may be reverse to the above. The cursor moving dial 45*b* is used for movement from side to side. By anticlockwise turning the cursor moving dial 45*b*, the cursor CR is moved to the left, and, by clockwise turning the cursor moving dial 45*b*, the cursor CR is moved to the right.

Figure 13:
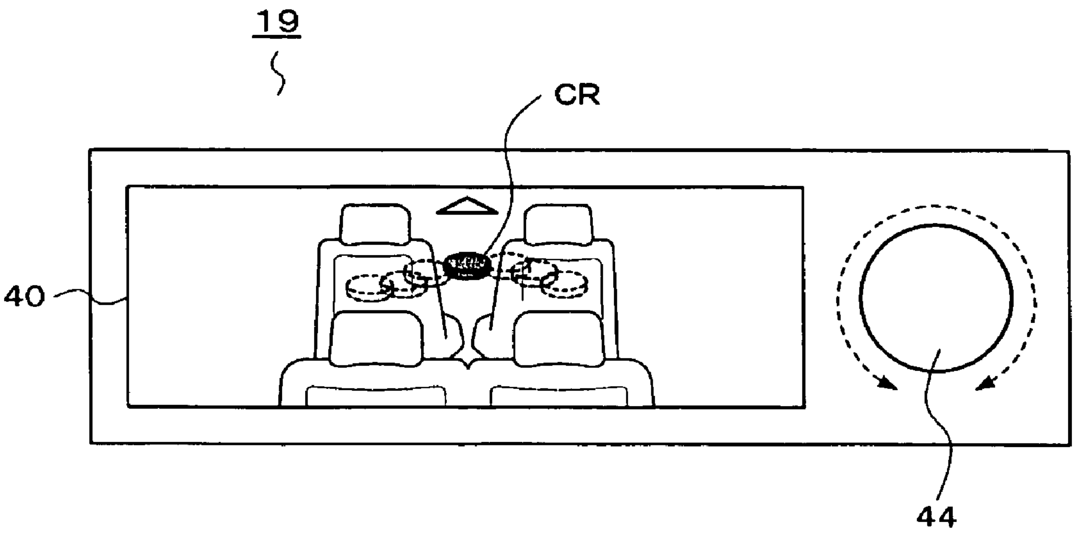
FIG. 13 is an illustration of an example of a user interface for sound-field adjustment.

Referring to FIG. 13, the graphics image displayed on the display section 40 is similar to that shown in FIG. 12.

In this case, a handler for cursor movement is only one cursor moving dial 45. In a movement pattern of the cursor CR in the display section 40 is, for example, the cursor CR traces one particular path. For example, by turning the cursor moving dial 45, in a traveling direction in accordance with the turning direction, the cursor CR can be moved while tracing the path. After the cursor CR is moved to the terminal point of the path, if the cursor moving dial 45 is operated in the same turning direction, the cursor CR may be restarted to move after returning to the initial point of the path.

Figure 14:
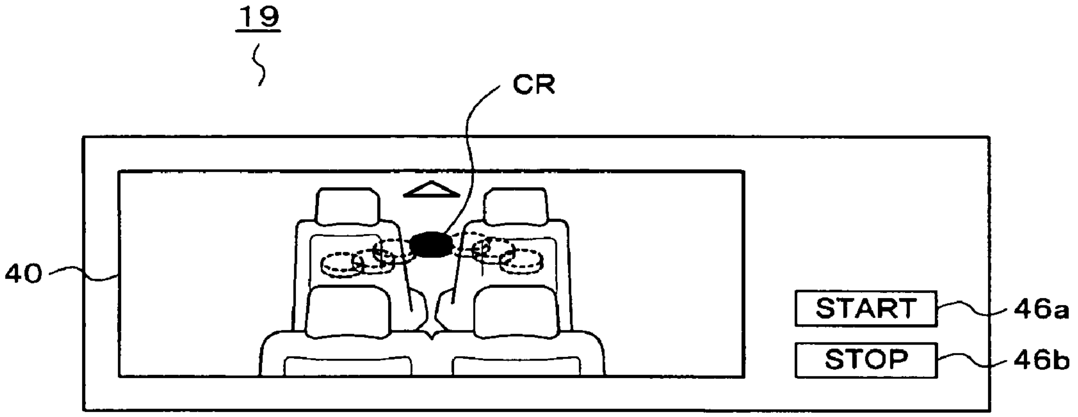
FIG. 14 is an illustration of an example of a user interface for sound-field adjustment.

FIG. 14 shows a form in which a start key 46*a* and a stop key 46*b* are added to the graphics image in a display section 40 similar to that shown in FIG. 13. Also in this case, a movement pattern of the cursor CR in the display section 40 is that the cursor CR traces one particular path. For example, by operating the start key 46*a* once, the cursor CR can start to move from the start point, using, as the start point, for example, a position indicating a target correcting position that has been used. While the cursor CR is moving as described above, an operation on the stop key 46*b* can stop the cursor CR. Also in this case, after the cursor CR moves to a final point of the path, when the stop key 46*b* has not bee operated yet, the cursor CR can restart to move from an initial point of the path after returning to the initial point.

Figure 15:
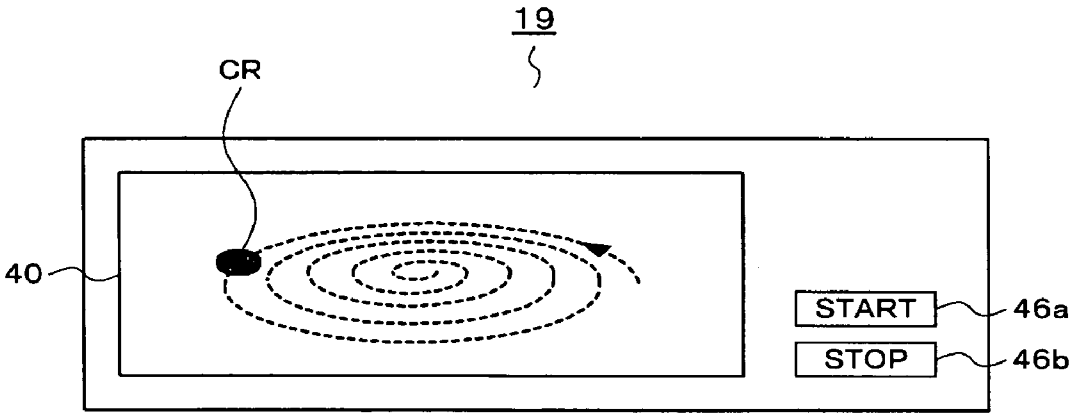
FIG. 15 is an illustration of an example of a user interface for sound-field adjustment.

FIG. 15 shows a modification of the graphics image in the display section 40 in a case in which the user interface 19 is configured so that the cursor CR is controlled to start to move or stop on a predetermined path by operating a start key 46*a* and a stop key 46*b*.

In other words, in the display section 40 in this case, the path of the cursor CR is displayed in a graphics form.

Obviously, the user interface 19 concerning sound-field correction is not limited to the examples shown in FIGS. 5, 6, and 11 to 15, but can be variously formed.

In the foregoing description of the embodiment, sound-field correction is performed in the automobile. The sound-field correction can be performed in other audio listening environments such as a room of an ordinary house other than the automobile. Even in a listening environment other the inside of the automobile, from the relationship between a listening position and each of disposed speakers, and the state of internal walls, based on correcting information on a particular normal correcting position, correcting information on another normal correcting position can be obtained.

In addition, in the foregoing description, correcting information is a propagation delay time from a speaker to a listening position, and time alignment (signal delay time adjustment) is used as an example of sound-field correction. However, in sound-field correction for a target correcting position in accordance with the present invention, in addition to time alignment, equalizing correction by the equalizing unit 112 shown in FIG. 2, and volume correction by the gain adjusting unit 113 may be performed. In addition, such a plurality of correcting elements for sound-field correction may be combined.

It should be understood by those skilled in the art that various modifications, combinations, sub-combinations and alterations may occur depending on design requirements and other factors insofar as they are within the scope of the appended claims or the equivalents thereof.

What is claimed is:

1. A sound-field correcting apparatus comprising:

information acquiring means for acquiring by measurement correcting information on each of a plurality of listening positions for listening to sound output;

sound-field correcting means for executing, based on the correcting information, predetermined audio signal processing for correcting a sound field formed at a target position by sound output from a plurality of sound sources;

designating means for designating thea target position in a predetermined space range including (a) said plurality of listening positions at which the information acquiring means acquires by measurement the correcting information and (b) at least one position other than the listening positions at which the information acquiring means acquires by measurement the correcting information, the target position serving as a position at which sound-field formation correction is to be performed;

correcting information acquiring means for acquiring, based on the correcting information on each of said plurality of listening positions, correcting information corresponding to the target position designated by said designating means; and control means for performing control based on the correcting information acquired by said correcting information acquiring means so that said sound-field correcting means executes the predetermined audio signal processing.

2. The sound-field correcting apparatus according to claim 1, wherein:

said information acquiring means comprises acoustic measurement means for measuring a predetermined acoustic measurement item; and in said information acquiring means, the correcting information on each of said plurality of listening positions is acquired as a result of measurements by said acoustic measurement means in which each of said plurality of listening positions is used as a measuring position.

3. The sound-field correcting apparatus according to claim 1, wherein:

said information acquiring means comprises acoustic measurement means for measuring a predetermined acoustic measurement item;

correcting information on at least one position among said plurality of listening positions is acquired by performing measurement by said acoustic measurement means in which said at least one position is used as a measuring position; and correcting information on at least one position other than the measuring position among said plurality of listening positions is acquired by performing calculation using correcting information on the measuring position and a predetermined calculation parameter in accordance with each of the listening positions in the sound field.

4. The sound-field correcting apparatus according to claim 1, further comprising storage means for storing beforehand the correcting information on each of said plurality of listening positions, wherein said information acquiring means acquires the correcting information on each of said plurality of listening positions by reading the correcting information stored in said storage means.

5. The sound-field correcting apparatus according to claim 1, further comprising storage means for storing beforehand correcting information on at least one reference position among said plurality of listening positions, wherein:

said information acquiring means acquires the correcting information on the reference position by reading the correcting information stored in said storage means; and correcting information on at least one position other than the reference position among said plurality of listening positions is acquired by performing calculation using the correcting information on the reference position and a predetermined calculation parameter in accordance with each of the listening positions in the sound field.

6. A sound-field correcting method for executing by a processor the sound-field correcting method comprising the steps of the processor:

acquiring by measurement correcting information on each of a plurality of listening positions for listening to sound output;

executing, based on the correcting information, predetermined audio signal processing for correcting a sound field formed at a target by sound output from a plurality of sound sources;

designating the position in a predetermined space range including (a) said plurality of listening positions at which correcting information is acquired by measurement and (b) at least one position other than the listening positions at which correcting information is acquired by measurement, the target position serving as a position at which sound-field formation correction is to be performed;

based on the correcting information on each of said plurality of listening positions, acquiring correcting information corresponding to the designated target position; and performing control based on the correcting information acquired in the step of acquiring the correcting information so that the predetermined audio signal processing is executed.

7. A sound-field correcting apparatus comprising:

an information acquiring unit acquiring by measurement correcting information on each of a plurality of listening positions for listening to sound output;

a sound-field correcting unit executing, based on the correcting information, predetermined audio signal processing for correcting a sound field formed at a target position by sound output from a plurality of sound sources;

a designating unit designating the target position in a predetermined space range including (a) said plurality of listening positions at which the information acquiring unit acquires by measurement the correcting information and (b) at least one position other than the listening positions position at which the information acquiring unit acquires by measurement the correcting information, the target position serving as a position at which sound-field formation correction is to be performed;

a correcting information acquiring unit acquiring, based on the correcting information on each of said plurality of listening positions, correcting information corresponding to the target position designated by said designating unit; and a control unit performing control based on the correcting information acquired by said correcting information acquiring unit so that said sound-field correcting unit executes the predetermined audio signal processing.

* * * * *